United States Patent [19]

Bianchi et al.

[11] Patent Number: 5,983,012
[45] Date of Patent: Nov. 9, 1999

[54] EXECUTING PROGRAMS OF A FIRST SYSTEM ON A SECOND SYSTEM

[75] Inventors: Richard S. Bianchi, Billerica, Mass.;
Dennis R. Flynn, Merrimack, N.H.;
Marcia T. Fogelgren, Acton, Mass.;
Richard A. Lemay, Carlisle, Mass.;
Mary E. Tovell, Newton, Mass.;
William E. Woods, Natick, Mass.

[73] Assignee: Bull HN Information Systems Inc., Billerica, Mass.

[21] Appl. No.: 08/128,456

[22] Filed: Sep. 28, 1993

[51] Int. Cl.$^6$ .................................................. G06F 9/455
[52] U.S. Cl. ............................... 395/500.44; 395/500.45; 395/527
[58] Field of Search ..................... 395/500.44, 500.45, 395/500.46, 500.47, 500.48, 527, 701

[56] References Cited

U.S. PATENT DOCUMENTS

| | | | |
|---|---|---|---|
| 4,727,480 | 2/1988 | Albright et al. | 395/500.46 |
| 4,888,680 | 12/1989 | Sander et al. | 395/500.46 |
| 4,926,322 | 5/1990 | Stimac et al. | 395/500.44 |
| 5,088,033 | 2/1992 | Binkley et al. | 395/500.45 |
| 5,218,691 | 6/1993 | Tuma et al. | 395/500.45 |
| 5,261,079 | 11/1993 | Celi, Jr. | 395/500.45 |
| 5,297,124 | 3/1994 | Plotkin et al. | 369/32 |
| 5,301,302 | 4/1994 | Blackard et al. | 395/500.41 |

OTHER PUBLICATIONS

"Bull repond a ses utilisateurs", 01 Informatique, Jun. 12, 1992.

"HP 3000 Emulation on HP Precision Architecture Computers" by Arndt B. Bergh, et al., Dec., 1987, Hewlett–Packard Journal, pp. 87–89.

Primary Examiner—Viet D. Vu
Attorney, Agent, or Firm—Gary D. Clapp; Faith F. Driscoll; John S. Solakian

[57] ABSTRACT

An emulator executes on a second data processing system as a second system user level process including a first system user level program, a first system executive program, and first system user and executive tasks. An emulator level is interposed between the second system user level process and a kernel level and contains pseudo device drivers. Each pseudo device driver corresponds to a first system input/output device. The kernel level includes kernel processes, each kernel process corresponding to a pseudo device driver. The second system hardware platform includes a plurality of second system input/output devices, wherein each second system input output device corresponds to a kernel process. Each combination of a pseudo device driver, a corresponding kernel process and a corresponding second system input/output device executes in a second system process and emulates the operations of a corresponding first system input/output task and the corresponding first system input/output device. The pseudo device drivers are constructed of a plurality of pseudo device queues, a return queue and a queue manager.

9 Claims, 6 Drawing Sheets

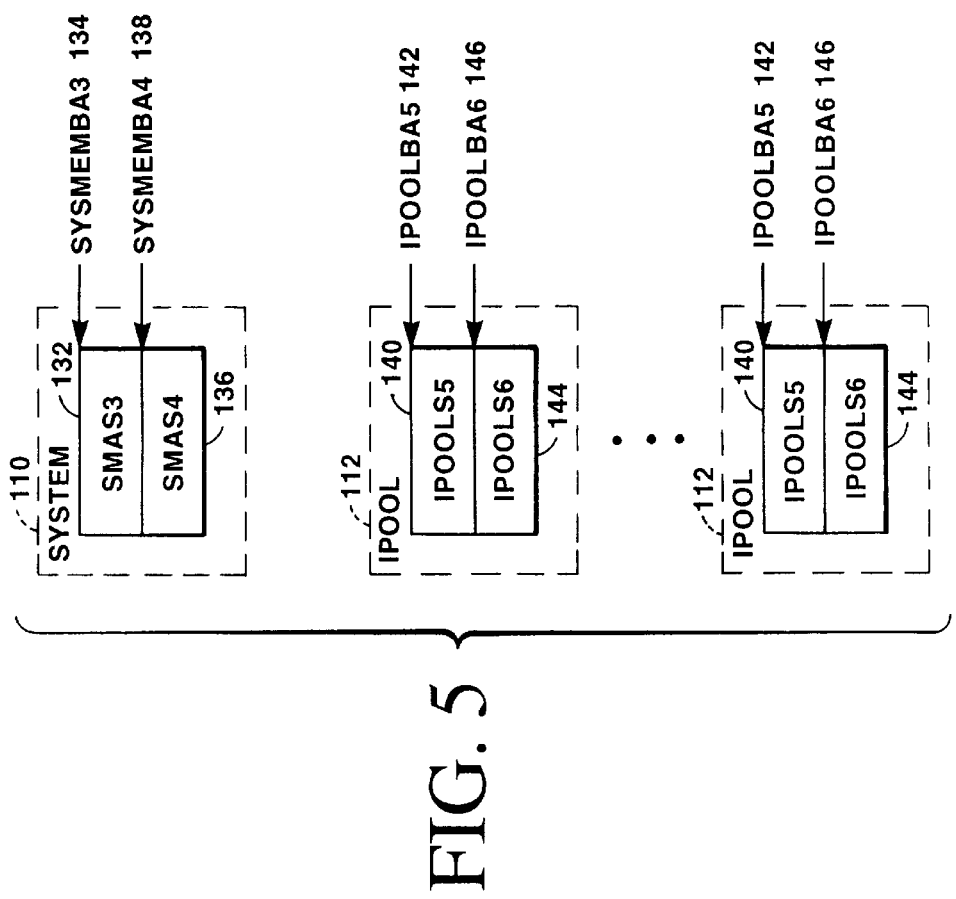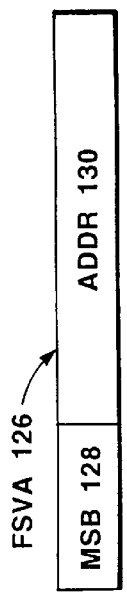
FIG. 6
FIG. 7
FIG. 5

EXECUTING PROGRAMS OF A FIRST SYSTEM ON A SECOND SYSTEM

CROSS REFERENCES TO RELATED APPLICATIONS

The present patent application is related to:

U.S. patent application Ser. No. 08/127,925, filed Sep. 28, 1993 for Executing Network Layered Communications of a First System On A Second System by Bruce D. Mayer, et al. now U.S. Pat. No. 5,619,582.

U.S. patent application Ser. No. 08/128,397, file Sep. 28, 1993, for Emulation of Disk Drivers Of A First System On A Second System by Richard S. Bianchi et al., and:

U.S. patent application Ser. No. 08/128,391, filed Sep. 28, 1993, for Emulation Of The Memory Functions Of A First System On A Second System by Marek Grynberg, et al. now U.S. Pat. No. 5,515,525.

FIELD OF THE INVENTION

The present invention relates to a method and apparatus for executing programs of a first system on a second system and, more particularly, to a method and apparatus for emulating a first operating system and hardware platform on a second operating system and hardware platform.

BACKGROUND OF THE INVENTION

A recurring problem in computer systems is that of executing, or running, programs written for a first computer system having a first hardware platform, that is, processor, memory and input/output devices, on a second computer system having a second and different hardware platform. The problem is compounded when the second computer system, as is frequently the case, uses a second operating system which may be substantially different from the operating system of the first system.

This problem usually occurs when a user or a manufacturer of computer systems is attempting to move application programs from a first system to a second system to upgrade or update the computer system while, at the same time, preserving the user's investment in application programs and data created through the application programs. This situation may arise, for example, when moving application programs from one proprietary system, that is, a system having an operating system and hardware platform which is particular to one manufacturer, to another proprietary system OR when moving application programs from a proprietary system to a "commodity" system, that is, a system having a hardware platform and operating system which is used by many manufacturers.

The problems arising from moving application programs from a first system to a second system arise from the fundamental functional structure of the systems and from the interactions and interrelationships of the functional elements of the systems.

Computer systems are constructed as layered levels of functionality wherein the three principal layers in any system are, from top to bottom, the user programs, the operating system and the hardware "platform". The user programs provide the primary interface to the users and provide the functions and operations to control the system in performing the specific operations desired by the user to perform the user's work, such as word processing spread sheets, and so forth. The hardware is comprised of the central processing unit, the memory and the input/output devices, such as displays, printers, disk drives and communications devices, which actually perform the required operations at the detailed level.

The operating system is functionally located "between" the user programs and the hardware and is comprised of a set of programs and routines that control the overall operations of the system and a set of routines that control the detailed operations of the hardware as necessary to manage and execute the operations directed by the applications programs. In this regard, the operating system is frequently comprised of two functional layers. One layer, frequently referred to, for example, as the "executive" level, interfaces with the applications programs and is comprised of a set of programs and routines and data structures which create operations referred to as "processes" or "tasks" which execute, at a high level, the operations required by the user programs. The "executive" level also includes a set of programs, routines and data structures that are used to manage and execute the operations required by the application programs and which generate requests to the lower level of the operation system.

The lower level of the operating system, frequently referred to as the "kernel", interfaces with the hardware elements of the system and is comprised of a set of routines, frequently referred to as "drivers" or "servers", for detailed control of the operations of the system hardware. The kernel routines receive the requests for operations from the executive level and in turn direct the detailed operations of the system hardware elements.

The basic problem in moving an application program from a first system to a second system arises because, although the system is comprised of separate functional layers, the characteristics of each functional layer and of the functions and operations performed by each functional layer are affected by the characteristics and functions of at least the next lower layer. That is, the application programs are written to take maximum advantage of the characteristics and features of the executive level of the operating system. The executive level of the operating system, in turn, is designed to take maximum advantage of the characteristics and features of the kernel level of the operating system while the kernel level is similarly designed not only to carry out the operations and functions required by the executive level but is influenced by the characteristics and functional features of the system hardware devices.

It is apparent, therefore, that the characteristics of a system as viewed by an application program are influenced by features and functions of the system from the executive level of the operating system down to the actual hardware elements of the system. As a consequence, and even though systems are designed to maintain the maximum clear separation and independence between functional layers, a functional layer created for one system, such as an application program or an operating system, will rarely be compatible with or function with a functional layer from another system.

The two primary approaches taken in the prior art for moving an application program from a first system to a second system are the recompilation of the application program to run on the second system directly and the emulation of the first system on the second system so that the application program can be run unchanged on the second system. While it is very common for an application program to be recompiled to run on a second system, this approach frequently essentially requires the recreation or rewriting of the application program if the two systems are sufficiently dissimilar, which requires a very substantial investment in man-hours. In addition, many application programs cannot be successfully recompiled onto a second system because the second system simply cannot support the operations required by the application program.

The present invention is concerned, however, with the second approach to moving an application program from a first system to a second system, that is, the emulation of the functionality of the first system on the second system in such a manner as to allow the application program to run unchanged on the second system as if the second system were, in fact, the first system.

The systems of the prior art have in general taken two approaches to emulating a first system on a second system wherein the two approaches differ in the level of the system at which the emulation is performed, that is, the level of the second system at which the transition occurs between the functionality of the first system and the functionality of the second system.

In the first approach, a layer of interpretive programs are interposed between the application programs and the operating system of the second system, that is, between the application programs and the execute level of the second operating system, The interpretive programs operate to translate each call, command or instruction of an application program into an operation or series of operations of the second operating system which are the equivalent of the operations of the first operating system that would have been performed in response to the same calls, commands or instructions from the application program.

While this approach seems straightforward, it frequently results in severe performance penalties because all operations must now be performed through yet another layer of programs with the resulting increase in time required to perform each operation. In addition, many operations that would have been performed as a single operation in the first operation system may have to be performed by several operations in the second operating system, again resulting in a performance penalty.

In the second approach, the transition between the functionality of the first operating system and the functionality of the second operation system is made at a very low level in the second system by moving the executive level and the upper portions of the kernel level of the first operating system onto the second system and providing new kernel level routines to interface the hardware elements of the second system. This approach again frequently results in significant performance penalties because of the added layer of programs, this time at the interface between the first operating system kernel level and the second system hardware elements, and because operations that the first kernel may have performed as a single operation with respect to a first system hardware element may now have to be performed by many operations with respect to the second system hardware elements.

SUMMARY OF THE INVENTION

The present invention provides an emulator and a method for emulating a first data processing system on a second data processing system. The first data processing system includes a user level, an executive level, an input/output level and a hardware platform, wherein the user level includes at least one user program and at least one executive program for managing operations of the first data processing system and the hardware platform includes first system input/output devices, including a first system memory. The executive level includes at least one user task performing user level program operations and at least one executive task performing executive program operations and the user and executive tasks generate requests for first system input/output operations. The input/output level includes a plurality of input/output tasks, wherein each input/output task corresponds to a first system input/output device and performs input/output operations in response to the input/output requests. The input/output tasks control corresponding first system input/output devices, which perform input/output operations in response to the corresponding input/output tasks.

The emulator and the emulation method of the present invention executes on the second data processing system and includes a second system user level process executing in a user level of the second data processing system, wherein the second system user level process includes the first system user level program, the first system executive program, and the first system user and executive tasks. The present invention further includes an emulator level interposed between the second system user level process and a kernel level, wherein the emulator level contains a plurality of pseudo device drivers. Each pseudo device driver corresponds to a first system input/output device and the kernel level, includes a plurality of kernel processes, each kernel process corresponding to a pseudo device driver. The second system hardware platform includes a plurality of second system input/output devices, wherein each second system input output device corresponds to a kernel process.

Each combination of a pseudo device driver, a corresponding kernel process and a corresponding second system input/output device executes in a second system process and emulates the operations of a corresponding first system input/output task and the corresponding first system input/output device.

According to the present invention, the pseudo device drivers are constructed of a plurality of pseudo device queues, a return queue and a queue manager.

Each pseudo device queue corresponds to a pseudo device driver and includes a device queue frame for each input/output request directed to the corresponding first system input/output device, wherein each device queue frame contains the request directed to the corresponding input/output device. Each kernel process is responsive to a request stored in a device queue frame of the corresponding pseudo device queue for reading the input/output request from the device queue frame and controlling the corresponding second system input/output device in executing the input/output request.

The return queue includes a return queue frame for each input/output request executed by a kernel process, wherein each kernel process is responsive to the completion of the execution of an input/output request for writing a request result into a return queue frame of the return queue.

The pseudo device queue manager responsive to each input/output request generated by a task for writing the input/output request into the pseudo device queue corresponding to the first system input/output device that the input/output request is directed to and to each return queue frame in the return queue for providing the request result to the task which generated the corresponding input/output request.

Each input/output request generated by a task is associated with an input/output instruction and the pseudo device queue manager further includes an instruction monitor for detecting first system input/output instructions and generating a input/output instruction output indication upon the occurrence of an input/output instruction. The pseudo device queue manager further includes a queue write mechanism that is responsive to an input/output instruction indication from the instruction monitor for writing the associated input/output request into the pseudo device queue corresponding to the first system input/output device to which the input/output request is directed.

The pseudo device queue manager also includes a queue read mechanism that is responsive to the writing of a return queue frame into the return queue for reading the request result from the return queue from and providing the request result to the task that generated the corresponding input/output request.

Each pseudo device queue further includes a queue header, which includes a semaphore settable by the queue manager when writing a queue frame to the pseudo device queue by the queue manager. Each kernel process is responsive to the setting of the semaphore in the queue header of the corresponding pseudo device queue for reading the corresponding queue frame from the pseudo device queue and for setting the semaphore when reading a queue frame from the pseudo device queue and the queue manager and the kernel process corresponding to a pseudo device queue are responsive to the semaphore of the queue header to inhibit writing a queue frame into the pseudo device queue and reading a queue frame from the pseudo device queue when a queue frame is being written to and read from the pseudo device queue.

Other features, objects and advantages of the present invention will be understood by those of ordinary skill in the art after reading the following descriptions of a present implementation of the present invention, and after examining the drawings, wherein:

BRIEF DESCRIPTION OF THE DRAWINGS

FIG. 5 represents the memory spaces of the first system as implemented on the emulating second system;

FIG. 6 represents a virtual address of the first system;

FIG. 7 represents the mapping of the memory spaces of the first system into the memory spaces of the second system; and, FIG. 8 is the address translation mechanism and memory space mapping mechanism of the emulation mechanism.

DETAILED DESCRIPTION

Figure 1:
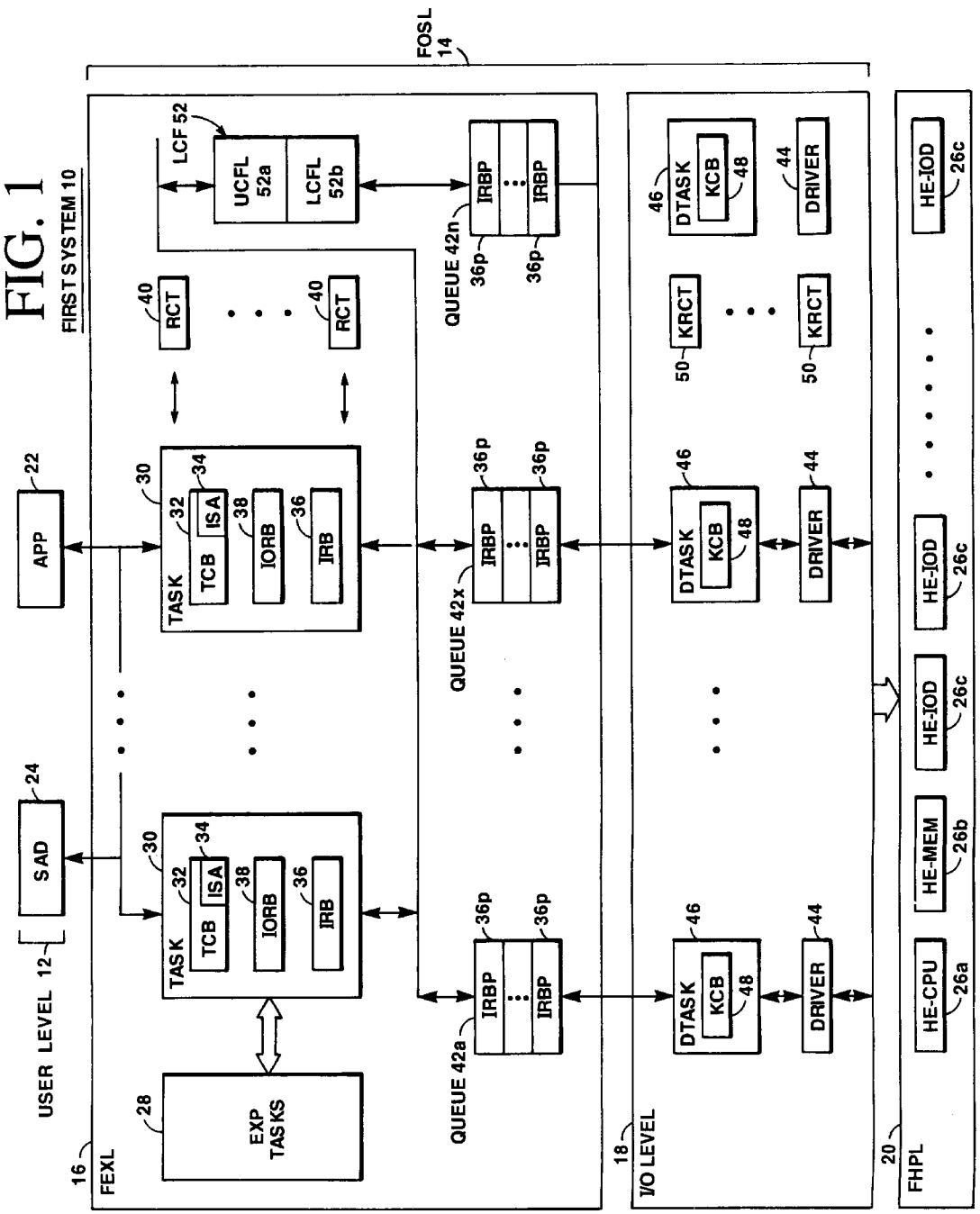
FIG. 1 is a block diagram of certain aspects of a first system which is to be emulated on a second system.

Referring to FIG. 1, therein are illustrated certain aspects of a first system which is to be emulated on a second system. The system represented in FIG. 1 and in the following discussions may be, for example, a DPS6 system running the GCOS6 operating system and the second system, upon which the first system is to be emulated, may be, for example, a DPX/20 system running the AIX* or BOS/X** operating systems, which are derived from the UNIX operating system. The DPS6 system with GCOS6 and the DPX/20 with BOS/X are available as products from Bull HN Information Systems Inc. of Billerica, Mass. while AIX* is the International Business Machines Corporation version of the UNIX** operating system.

AIX is a registered trademark of Internation Business Machines Corporation.
UNIX is a registered trademark of X/Open Co. Ltd.

A. General Description Of A System To Be Emulated (FIG. 1)

As represented in FIG. 1, a First System 10 is a multi-layered mechanism comprised of a User Level 12, a First System Operating System Level (FOSL) 14 comprised of a First System Executive Level (FEXL) 16 and a First System Input/Output Level (I/O Level) 18, and a First System Hardware Platform Level (FHPL) 20. User Level 12 is comprised of the Application Programs (APPs) 22 and various user visible System Administrative (SADs) programs 24, such as the programs used to administer First System 10 by a system administrator and maintenance and fault isolation programs. It is well known to those of ordinary skill in the art that the System Administrative Programs (SADs) 24 are a part of the operating system and thus execute below the user programs and are not actually a part of User Level 12 indicated herein. System Administrative Programs (SAADs) 24 are grouped together with Application Programs (APPs) 22, that is with the user programs, for convenience in the present description and User Level 12 is used to generally represent all levels of the system above the First System Executive Level (FEXL) 16. First System Hardware Platform Level (FHPL) 20 is comprised of the system Hardware Elements (HE) 26, which include a Central Processing Unit (CPU) 26a, physical Memory 26b, and Input/Output Devices (IODs) 26c, such as displays, workstations, disk drives, printers and communications devices and links.

1. FIRST SYSTEM EXECUTIVE LEVEL (FEXL) 16

As indicated in FIG. 1, First System Executive Level (FEXL) 16 includes a plurality of Executive Program Tasks (EXP Tasks) 28 which operate to manage the operations of First System 10, including directing the overall operations of First System 10, scheduling and managing the operations executed by First System 10 on behalf of Application Programs (APPs) 22 and System Administrative Programs (SADs) 24 and managing the resources of First System 10, such as assigning memory space for operations and carrying out data and program protection functions.

The operations performed in First System 10 in execution of an Application Program (APP) 22 or a System Administrative Program (SAD) 24 are executed through a plurality of Tasks 30 and any program executing on First System 10 may spawn one or more Tasks 30. A Task 30 may be regarded as being analogous to a process, wherein a process is generally defined as a locus of control which moves through the programs and routines and data structures of a system to perform some specific operation or series of operations on behalf of a program. There is a Task Control Block (TCB) 32 associated with each Task 30 wherein the Task Control Block (TCB) 32 of a Task 30 is essentially a data structure containing information regarding and defining the state of execution of the associated Task 30. A Task Control Block (TCB) 32 may, for example, contain information regarding the state of execution of tasks or operations that the Task 30 has requested be performed and the information contained in a Task Control Block (TCB) 32 is available, for example, to the programs of Executive Program Tasks (EXP Tasks) 28 for use in managing the execution of the Task 30. Each Task 30 may also include an Interrupt Save Area (ISA) 34 which is used to store hardware parameters relevant to the Task 30.

Any Task 30 may issue requests for operations to be performed by First System 10 on behalf of the Task 30 to Executive Program Tasks (EXP Tasks) 28 and Executive Program Tasks (EXP Tasks) 28 will respond to each such request by issuing a corresponding Indirect Request Block (IRB) 36 wherein an Indirect Request Block (RB) 36 is essentially a data structure containing the information necessary to define the operation requested by the Task 30 and will generally include pointers or other indicators identifying the corresponding Task 30 and its associated Task Control Block (TCB) 32. One form of request that can be issued by a Task 30 is a request for an input/output operation, that is, a transfer of data to or from an input/output device (IOD) 26c and a Task 30 will generate a request for an input/output operation in the form of an Input/Output Request Block (IORB) 38 wherein each Input/Output Request Block (IORB) 38 contains information defining the data to be transferred. In this instance, the corresponding Indirect Request Block (IRB) 36 will include a pointer or other indicator identifying the Input/Output Request Block (IORB) 38 which initiated the generation of the Indirect Request Block (RB) 36.

In general, Task Control Blocks (TCBs) 32 are distinguished from Input/Output Request Blocks (IORBs) 38 in that Input/Output Request Blocks (IORBs) 38 are primarily concerned with input/output operations and may thus be passed to processes for subsequent handling, thereby effectively removing Input/Output Request Blocks (IORBs) 38 from the set of pending operations to be performed by the First System 10 tasks. Task Control Blocks (TCBs) 32 are primarily concerned with the internal or inter-task operations of First System 10 and generally must be handled by the First System 10 tasks and cannot be passed off. As such, Input/Output Request Blocks (IORBs) 38 are generally given a higher priority than Task Control Blocks (TCBs) 32, thus clearing First System 10's operations to handle Task Control Blocks (TCBs) 32. Exceptions may be made, however, for example, for clock and task inhibit Task Control Blocks (TCBs) 32, which must be given the highest priority. It is to be understood in the following descriptions of the present invention that the emulation of a First System 10 on a second system will include emulation of requests that are represented by Indirect Request Blocks (IRBs) 36 as the emulation of First System 10 operations and are not limited solely to system input/output requests, although system input/output requests are the primary form of emulation discussed in the following. All references in the following to Input/Output Request Block (IORB) operations or Indirect Request Block (IRB) operations are to be taken to refer interchangeably to both types of operations, that is, to both Indirect Request Block (IRB) requests and Input/Output Request Block (IORB) requests.

First System Executive Level (FEXL) 16 will further include a set of data structures referred to as Resource Control Tables (RCTs) 40 which are used to store information describing the resources of First System 10, such as Input/Output Devices (IODs) 26c, the allocation of Memory 26b space, and so forth. The internal structure of the Resource Control Tables (RCTs) 40 is generally flexible, except for having a defined header structure through which programs and routines executing in First System 10 may access the contents of the Resource Control Tables (RCTs) 40. A given Resource Control Table (RCT) 40 may contain information defining the characteristics of, for example, a communications link or processor or the characteristics of a disk drive while another Resource Control Table (RCT) 40 may also contain information regarding the tasks or requests being executed by a corresponding resource, such as a communications link, or pointers or addresses to other data structures containing such information.

Finally, First System Executive Level (FEXL) 16 will include a plurality of queue structures, indicated as Queues 42a through 42n, the function of which is to pass requests for operations on behalf of the Tasks 30 to I/O Level 18 and to receive back from I/O Level 18 the responses indicating the results of the operations of I/O Level 18 in response to the requests passed from First System Executive Level (FEXL) 16. Each Queue 42 corresponds to and is associated with a Driver 44 of First System 10's I/O Level 18 wherein there is at least one Driver 44 for and corresponding to each Hardware Element (HE) 26 of FBP 20 for controlling operations of the corresponding Hardware Element (HE) 26 and wherein each Queue 42 stores pending requests for operations by the corresponding Driver 44 and Hardware Element (HE) 26.

Requests may be enqueued in Queues 42 in the form of Indirect Request Block (IRB) 36 Pointers, wherein an Indirect Request Block Pointer (IRBP) 36p indicates the location in the system of the corresponding Indirect Request Block (IRB) 36. The requests, that is, the pointers, will be read from each Queue 42 by the corresponding server and driver routines of I/O Level 18, described further below, which will operate upon the requests. The responses from I/O Level 18 resulting from the operations performed in execution of the requests are Indirect Request Blocks (IRBs) 36 and are enqueued in the Queues 42, which will be described in further detail below, and the pointers may then be read from Queues 42 by Executive Program Tasks (EXP Tasks) 28 to locate the data structures containing the returned results of the operations.

It should be noted with regard to the above description of First System 10 that the interface by which requests and responses are passed between First System Executive Level (FEXL) 16 and I/O Level 18 may take many forms, depending upon the implementation chosen by the designer. For example, requests may be passed directly, as requests, to the hardware element servers and drivers of I/O Level 18 and the information used by the servers and drivers of I/O Level 18 in executing the requests may be stored in a Queue 42 to be read by the servers and drivers of I/O Level 18 as necessary. The First System Executive Level (FEXL) 16/I/O Level 18 interface may be implemented in other ways, such as with a single Queue 42 with the drivers and server routines of I/O Level 18 reading requests from the single Queue 42 and passing the results of the request operations back to Tasks 30 through the single Queue 42 and a queue manager task for controlling the writing and reading of requests to and from the single Queue 42.

2. I/O Level 18

Referring now to I/O Level 18, as described above, I/O Level 18 includes a plurality of driver programs and routines, indicated generally in FIG. 1 as Drivers 44, wherein there are one or more Drivers 44 for each element of First System Hardware Platform Level (FHPL) 20 for controlling the operations of the elements of First System Hardware Platform Level (FHPL) 20.

As indicated in FIG. 1, requests to I/O Level 18 for an input/output operation by an element of I/O Level 18 are handled by a Driver Task (DTask) 46 corresponding to and associated with the Hardware Element (HE) 26 element identified by the request and each Driver Task (DTask) 46 includes a corresponding Kernel Control Block (KCB) 48 which is generally used in the execution of I/O Level 18 operations in a manner similar to the use of Tasks 30 and Task Control Blocks (TCBs) 32 in First System Executive Level (FEXL) 16. It should be noted that Driver Tasks (DTasks) 46 and Kernel Control Blocks (KCBs) 48 are structured to meet the needs of I/O Level 18 operations and thus generally are not and need not be similar in detail to Tasks 30 and Task Control Blocks (TCBs) 32 and, in certain implementations of I/O Level 18, these functions may be performed by other data and control structures. For example, Drivers 44 may have access to and make use of Task Control Blocks (TCBs) 32, Indirect Request Blocks (IRBs) 36 and Input/Output Request Blocks (IORBs) 38 for these purposes.

Finally, I/O Level 18 will include Kernel Resource Control Tables (KRCTs) 50 for storing device and system information used by Drivers 44 in executing requests from First System Executive Level (FEXL) 16. Again, while Kernel Resource Control Tables (KRCTs) 50 are similar in function to Resource Control Tables (RCTs) 40, Kernel Resource Control Tables (KRCTs) 50 are structured to meet the needs of I/O Level 18 operations and thus generally need not be identical in detail to Resource Control Tables (RCTs) 40 and, in certain implementations of I/O Level 18, these functions may be performed by other data and control structures. For example, Drivers 44 may instead have access to and make use of Resource Control Tables (RCTs) 40 for these purposes.

3. Layered Communications Facilities

Lastly, First System 10 may provide one or more layered communications facilities, such as the OSI/DSA networking and network terminal drivers and concentrators available from Bull HN Information Systems Inc. of Billerica, Mass. As is well known, many such communications facilities, represented in FIG. 1 by Layered Communications Facilities (LCF) 52 are essentially comprised of a plurality of well defined functional levels wherein the upper levels correspond to, or are implemented as, Tasks 30, and wherein the lower levels, which perform more detailed communications operations, correspond to Driver Tasks (DTask) 46 and control various communications drivers, such as certain of Hardware Element (HE)-Input/Output Devices (IODs) 26c. As indicated in FIG. 1, Layered Communications Facilities (LCF) 52 may be represented as being comprised of Upper Communications Facilities Layers (UCFLs) 52a which execute in First System Executive Level (FEXL) 16, or in User Level 12, and which communicate with Lower Communications Facilities Layers (LCFLs) 52b which execute in I/O Level 18 and which in turn control corresponding communications devices of Hardware Element (HE)-Input/Output Devices (IODs) 26c.

4. Alternate Systems and Division of Systems Into Functional Levels

Finally, it should be noted with regard to the above described separation of First System 10's operating levels into a First System Executive Level (FEXL) 16 level and an I/O Level 18 that not all First Systems 10 will have a formal separation of the functions of the system into distinctly defined levels and another First System 10 may in fact architecturally regard the various tasks as essentially peer tasks. In any system, however, even one in which all tasks are regarded as peers, certain tasks will be involved in higher level operations while other tasks will be involved in more detailed tasks and it will be possible to draw a boundary between the tasks separating the higher level tasks from the detail level tasks.

The above described separation of a First System 10 into a First System Executive Level (FEXL) 16 level and an I/O Level 18 should therefore not be regarded as an architectural requirement imposed on the First System 10, but instead as a recognition that certain tasks or processes perform operations at a more detailed level than others and that a boundary between the types of tasks may be drawn for the purposes of the present invention, even if not actually imposed by the architecture of the particular First System 10.

B. General Description, Emulation Of A First System On A Second System (FIG. 2)

1. Second System 54 Functional Levels

Figure 2:
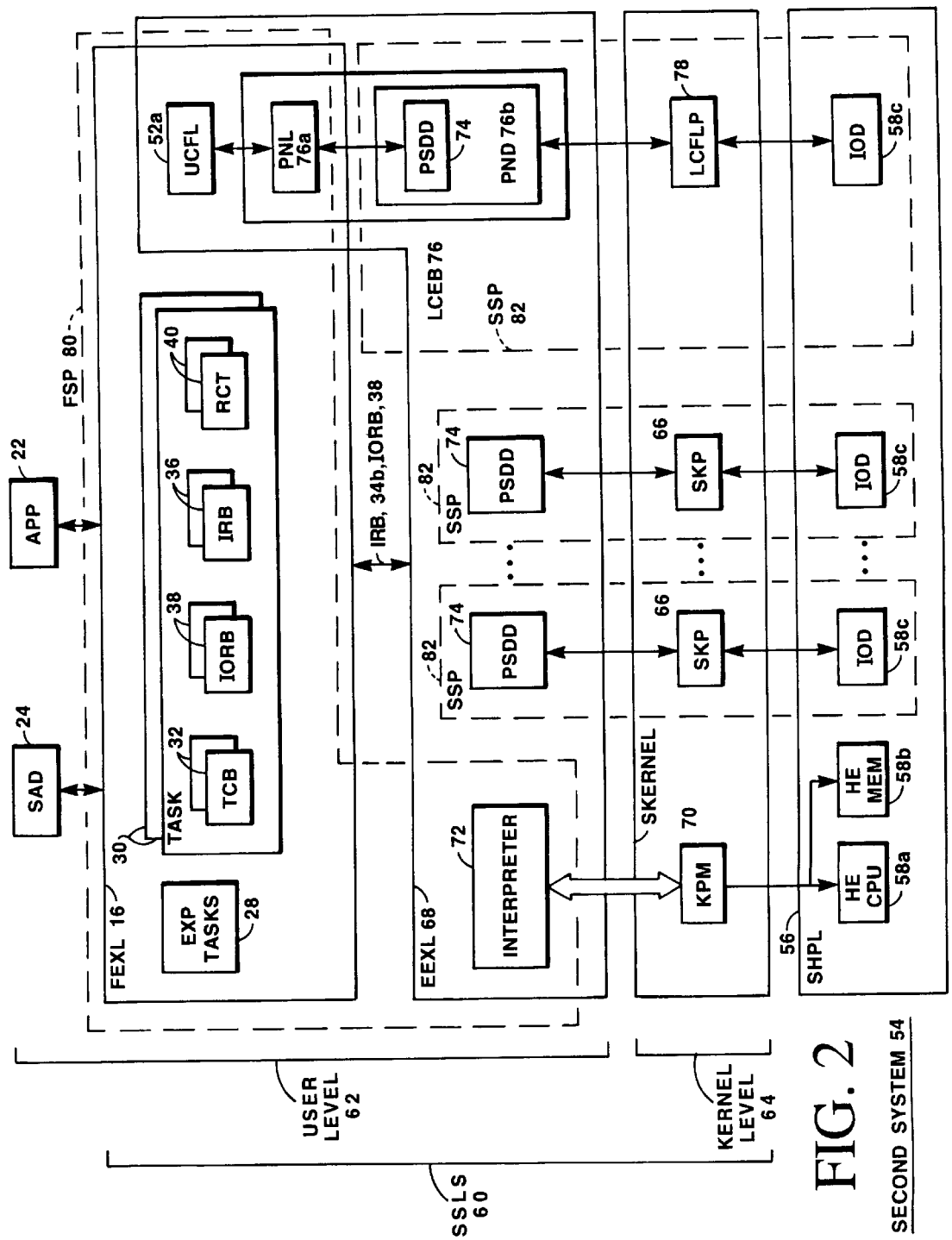
FIG. 2 is the emulation mechanism of the present invention as implemented on a second system.

FIG. 2 illustrates the layered mechanisms of a Second System 54 that is emulating a First System 10 according to the present invention.

As shown, Second System 54 includes the native Second System Hardware Platform (SHPL) 56 which is comprised of the native Hardware Elements (HEs) 58 of Second System 54. As in First System 10, Hardware Elements 58 of Second System 54 include a Central Processing Unit (CPU) 58a, a physical Memory 58b, and Input/Output Devices (IODs) 58c, such as displays, workstations, disk drives, printers and communications devices and links.

As has been described, Second System 54 is, in the present implementation of the invention, a UNIX based system and, as such and according to the usual conventions of UNIX based systems, the Second System Levels (SSLs) 60 executing on Second System Hardware Platform (SHPL) 56 are comprised of a User Level 62 and a Second System Kernel level (SKernel) 64. In the present invention, User Level 62 will include Application Programs (APPs) 22 and System Administrative Programs (SADs) 24, which were executing on First System 10, and First System Executive Level (FEXL) 16, which was executing on First System 10.

As has been described above, it is unlikely that First System Executive Level (FEXL) 16 and Second System Kernel Level (SKernel) 64 will be able to communicate or operate with each other to any useful degree.

The bridge and interface between First System Executive Level (FEXL) 16 and Second System Kernel Level (SKernel) 64, and therefore the bridge and interface between the functions and operations of First System 10 in emulation on Second System 54 and the functions and operations of Second System 54 which allow Application Programs (APPs) 22, System Administrative Programs (SADs) 24 and First System Executive Level (FEXL) 16 of First System 10 to execute on Second System 54, is provided through an Emulator Executive Level (EEXL) 68. Emulator Executive Level (EEXL) 68 resides and executes in Second System 54's User Level 62 between First System Executive Level (FEXL) 16 of First System 10 and Second System Kernel Level (SKernel) 64 of Second System 54.

As will be described in further detail in the following descriptions of Emulator Executive Level (EEXL) 68, Emulator Executive Level (EEXL) 68 does not comprise a new, separate layer or level of functionality in Second System Levels (SSLs) 60. Emulator Executive Level (EEXL) 68 is instead essentially comprised of certain elements of First System Executive Level (FEXL) 16 which have been transformed into new mechanisms which appear, to the remaining, unchanged elements of First System Executive Level (FEXL) 16, to operate in the same manner as the original, untransformed elements of First System Executive Level (FEXL) 16. At the same time, these new mechanisms of Emulator Executive Level (EEXL) 68 appear to the mechanisms of Second System Kernel Level (SKernel) 64 to be the native mechanisms of Second System 54's User Level 62 with which Second System Kernel Level (SKernel) 64 is accustomed to operate.

The following will initially describe the present invention from the functional viewpoint of First System 10, that is, will discuss the structure and operations of the emulation mechanisms of the present invention primarily from the viewpoint of First System 10's functions and operations. The following will then discuss the emulation of First System 10, including the First System 10 programs and tasks being executed on Second System 54 and the emulation mechanisms, from the structural and operational viewpoint of Second System 54, that is, as user programs and structures executing in Second System 54.

2. First System Executive Level (FEXL) 16 and Second System Kernel Level (SKernel) 64

Referring first to First System Executive Level (FEXL) 16, First System Executive Level (FEXL) 16 as executing on Second System 54 again includes Executive Program Tasks (EXP Tasks) 28, the Tasks 30 spawned by the programs of Executive Program Tasks (EXP Tasks) 28, Application Programs (APPs) 22 and System Administrative Programs (SADs) 24, the Task Control Blocks (TCBs) 32 associated with the Tasks 30, the Indirect Request Blocks (IRBs) 36 and Input/Output Request Blocks (IORBs) 38 created as a result of requests for operations by the programs of Executive Program Tasks (EXP TASKS) 28, Application Programs (APPs) 22 and System Administrative Programs (SADs) 24, and the Resource Control Tables (RCTs) 50 that these elements of First System Executive Level (FEXL) 16 are accustomed to operating with. These elements of First System Executive Level (FEXL) 16 will continue to operate in the same manner as in First System 10, thereby providing, at this level, the operating environment necessary for the execution of Application Programs (APPs) 22 and System Administrative Programs (SADs) 24 in their original forms. As will be described further below, the functions of Queues 42 and the First System Executive Level (FEXL) 16 interfaces to First System 10's Kernel 18 have been absorbed into the mechanisms of Emulator Executive Level (EEXL) 68.

The Second System Kernel Level (SKernel) 64 processes are represented in FIG. 2 by Second System Kernel Processes (SKPs) 66 and, for purposes of the present invention, Second System Kernel Level (SKernel) 64 will, as described further below, contain a Second System Kernel Process (SKP) 66 for each Driver Task (DTask) 46 and associated Driver 44 of First System 10 which is to be emulated in Second System 54. As also indicated, Second System Kernel Level (SKernel) 64 includes a Kernel Process Manager process (KPM) 70, which serves to manage Second System Kernel Processes (SKPs) 66.

Second System Kernel Level (SKernel) 64 is essentially comprised of Second System 54 mechanisms and functions which are generally analogous to those of First System 10's Kernel 18, but are in the forms which are native to Second System 54. For example, Second System 54 has been described as possibly being a UNIX based system and, in this instance, the functions and operations performed by Driver Tasks (DTasks) 46 and Drivers 44 of First System 10's I/O Level 18 will be performed by Second System 54 Second System Kernel Level (SKernel) 64 processes.

3. Emulator Executive Level (EEXL) 68

As represented in FIG. 2, Emulator Executive Level (EEXL) 68 includes an INTERPRETER 72 which interprets First System 10 instructions into equivalent Second System 54 instructions, thereby allowing Second System 54's CPU 56a, Memory 56b, and other elements of Second System 54 to emulate the operations of the corresponding elements of First System 10.

Emulator Executive Level (EEXL) 68 further includes a plurality of Pseudo Device Drivers (PSDDs) 74 wherein there is a Pseudo Device Driver (PSDD) 74 for each input/output device or type of input/output device or other functionality of First System 10 which appeared in First System Hardware Platform Level (FHPL) 20 and which is to be emulated in Second System 54. As such, Pseudo Device Drivers (PSDDs) 74 will include Pseudo Device Drivers (PSDDs) 74 for terminals, for disk drivers, for tape drivers, for displays, and for certain communication devices.

As indicated in FIG. 2, there will be a Second System Kernel Process (SKP) 66 for and corresponding to each Pseudo Device Driver (PSDD) 74. In this regard, it should be noted that the term Pseudo Device Driver as used with regard to FIG. 2 is a designation which reflects First System Executive Level (FEXL) 16's view of the functions and operations performed by these elements of Emulator Executive Level (EEXL) 68. That is, to First System Executive Level (FEXL) 16, and to Application Programs (APPs) 22, System Administrative Programs (SADs) 24 and Tasks 30, each Pseudo Device Driver (PSDD) 74 and associated Second System Kernel Process (SKP) 66 appears to Tasks 30 to function in a manner that is equivalent to Drivers 44 and Driver Tasks (DTasks) 46 of First System 10's I/O Level 18. As has been described briefly above, and as described further below, these same mechanisms of Emulator Executive Level (EEXL) 68 appear to Second System Kernel Level (SKernel) 64 to be native Second System 54 User Level 62 functions and mechanisms and there will be a Second System Kernel Process (SKP) 66 for and corresponding to each Pseudo Device Driver (PSDD) 74, that is, for each device or function of First System 10 which is to be emulated in Second System 54. The present invention does not require the modification of Second System Kernel 64 and does not require the creation of new drivers for the purposes of the present invention. The present invention spawns processes to execute existing Second System Kernel Processes (SKPs) 66.

6. Emulation of Communications Link Layers

The communications operations of First System 10 are emulated in Second System 54 in a manner corresponding to the emulation of First System 10 input/output devices, but with the specific form of emulation depending upon the specific type of communications operations. For example, in the present invention certain communications devices of First System 10 are emulated by porting the driver programs and routines from the native First System 10 code into native Second System 54 code, or alternatively by providing equivalent Second System 54 Second System Kernel Processes (SKP) 66, which are called by First System Executive Level (FEXL) 16 through a corresponding Pseudo Device Driver (PSDD) 74 and executed as native Second System 54 processes.

Layered network communications, such as OSI/DSA, may be executed through the usual layered communications mechanisms, but wherein certain of the higher communications layers reside in First System Executive Level (FEXL) 16 or in User Level 12 in Second System 54 in their native First System 10 form, that is, as originally implemented in First System 10, while the lower communications layers are implemented in Emulator Executive Level (EEXL) 68, that is, as native Second System 54 program layers, and use the Second System Kernel Processes (SKP) 66 provided by Second System Kernel Level (SKernel) 64 and Input/Output Devices (IODs) 58c provided in Second System Hardware Platform Level (SHPL) 56 in place of the drivers and devices provided in First System 10. This is illustrated in FIG. 2 wherein Layered Communications Facilities (LCF) 52 is shown as being emulated by Upper Communications Facilities Layers (UCFLs) 52a residing and executing in First System Executive Level (EEXL) 16 or User Level 12 as native First System 10 program layers and Lower Communications Facilities Layers (LCFLs) 52b residing and executing in Second System Kernel Level (SKernel) 64 as native Second System 54 processes, indentified in FIG. 2 as Lower Communications Facilities Layer Processes (LCFLP) 78.

As shown in FIG. 2, Upper Communications Facilities Layers (UCFLs) 52a and Lower Communications Facilities Layer Processes (LCFLP) 78 are functionally interconnected and communicate through a new layer, referred to as Layered Communications Emulation Bridge (LCEB) 76, which is comprised of two cooperative modules indicated in FIG. 2 as Pseudo Network Layer (PNL) 76a residing and executing in First System Executive Level (FEXL) 16 as a native First System 10 program module and Pseudo Network Driver (PND) 76b residing and executing in Second System Kernel (SKernel) 64 as a native Second System 54 program module.

According to the present invention, therefore, Upper Communications Facilities Layers (UCFLs) 52a, which are the layered communications levels with which Tasks 30 communicate directly in First System 10, are retained in Second System 54 and execute in Emulator Executive Level (EEXL) 68 or in User Level 12, so that Tasks 30 may execute layered communications operations as if they were executing in First System 10.

In turn, Lower Communications Facilities Layers (LCFLs) 52b are replaced by corresponding native Second System 54 communications layers referred to in FIG. 2 as Lower Communications Facilities Layer Processes (LCFLP) 78 which execute the functions and operations that were executed in First System 10 by the native Lower Communications Facilities Layers (LCFLs) 52b of First System 10. As shown, Lower Communications Facilities Layer Processes (LCFLP) 78 perform essentially the same functions as Lower Communications Facilities Layers (LCFLs) 52b and the functions and operations that were performed in First System 10 by the Driver Tasks (DTask) 46 and Drivers 44, including controlling the Second System 54 Hardware Element (HE)-Input/Output Devices (IODs) 58c which correspond to the layered communications devices Hardware Element (HE)-Input/Output Device (IOD) 26c of First System 10.

The bridge between Upper Communications Facilities Layers (UCFLs) 52a and Lower Communications Facilities Layer Processes (LCFLP) 78 is, as described above, provided by the new Layered Communications Emulation Bridge (LCEB) 76 comprised of cooperative modules Pseudo Network Layer (PNL) 76a executing in First System Executive Level (FEXL) 16, that is, in the First System 10 operating environment, and Pseudo Network Driver (PND) 76b in Emulator Executive Level (EEXL) 68, in the Second System 54 operating environment.

In the exemplary implementation of the present invention as described herein, Layered Communications Facilities (LCF) 52 are divided between layer 4, the transport layer, and level 3, the network layer, of the seven layer ISO model, so that layers 7 through 4 comprise Upper Communications Facilities Layers (UCFLs) 52a executing in First System Executive Level (FEXL) 16 while layers 3 through 1 comprise Lower Communications Facilities Layer Processes (LCFLP) 78 executing in Second System Kernel (SKernel) 64 and in Second System Hardware Platform Level (SHPL) 56.

According to the present invention, Pseudo Network Layer (PNL) 76a emulates and appears to Upper Communications Facilities Layers (UCFLs) 52a as the X.25 network layer of the seven layer OSI model and transforms requests from the transport layer into First System 10 input/output requests. Pseudo Network Driver (PND) 76b appears to Lower Communications Facilities Layer Processes (LCFLP) 78 as the transport layer of the seven layer OSI model and maps requests from Pseudo Network Layer (PNL) 76a into UNIX API requests that may be executed by Lower Communications Facilities Layer Processes (LCFLP) 78 and Hardware Element (HE)-Input/Output Devices (IODs) 58c executing layered communications operations in Second System 54.

Lastly, Pseudo Network Driver (PND) 76b includes the internal structure of a Pseudo Device Driver (PSDD) 74, which will be described fully in the following descriptions, and for these purposes the descriptions of Pseudo Device Drivers (PSDDs) 74 should be regarded as applying equally to Pseudo Network Driver (PND) 76b as regards the structures and operations of Pseudo Device Drivers (PSDDs) 74.

According to the present invention, therefore, a new communications bridge layer is interposed between an upper communications layer executing in the First System 10 environment and a next lower communications layer executing in the Second System 54 environment. The bridge layer is comprised of an upper module executing in the First System 10 environment and appearing to to the upper communications layer to be the next lower layer and a lower module executing in the Second System 54 environment and appearing to the next lower communications layer to be the upper communications layer. This invention may be implemented between any two layer communications layers having a hierarchical relationship and, because neither of the two bridge modules is responsible for peer to peer network protocols, the integrity of the layered communications facilities is preserved.

7. First System 10 and the Emulation Mechanism As Second System 54 Processes

As has been described previously, Second System 52 is a UNIX based system and, as is well known, UNIX based systems may generally be regarded as comprising two levels executing above the hardware platform level, generally referred to as the User Level and the Kernel Level, indicated in FIG. 2 as User Level 62 and Kernel Level 64. User Level 62 generally comprises the user accessible functions and operations of the system and Kernel Level 64 generally comprises the functions and operations that are "internal" to the system and are not usually accessible to the users. As is also well understood, all operations in a UNIX based system, whether in User Level 62 or in Kernel Level 64, are executed within UNIX processes.

According to the present invention, the Executive Program Tasks (EXP Tasks) 28 and Tasks 30 being executed on behalf of Application Programs (APPs) 22 and System Administrative Programs (SADs) 24, Upper Communications Facilities Layers (UFCLs) 52a with Pseudo Network Layer (PNL) 74a, and INTERPRETER 72 are to be executed in Second System 52 in a manner so as to appear to Second System 52 to be "native" to Second System 52. Accordingly, and as indicated in FIG. 2, Executive Program Tasks (EXP Tasks) 28 and Tasks 30 being executed on behalf of Application Programs (APPs) 22 and System Administrative Programs (SADs) 24, Upper Communications Facilities Layers (UCFLs) 52a with Pseudo Network Layer (PNL) 74a, and INTERPRETER 72 are executed in the Second System 52 of the present implementation in a First System Process (FSP) 80 wherein First System Process (FSP) 80 is one or more user processes according to the conventions of the UNIX based operating system executing on Second System 52.

It should be noted that, while FIG. 2 illustrates a single instance of a First System 10 being emulated on Second System 54, it is possible for multiple instances of a First System 10 to be concurrently emulated on Second System 54, or even for multiple instances of different First Systems 10 to be concurrently implemented on a Second System 54, so long as Second System 54 is a multi-tasking capable system. In such instances, each instance of a First System 10 will be executed in the Second System 54 as a different set of First System Processes (FSPs) 80 executing in the Second System 54.

In addition, each Pseudo Device Driver (PSDD) 74 with its associated Second System Kernel Process (SKP) 66 and Second System 54 hardware device or devices, such as a Hardware Element (HE)-Input/Output Device (IOD) 58c, comprises a Second System 54 process, which are indicated in FIG. 2 as Second System Processes (SSPs) 82. In a similar manner, each instance of a Pseudo Network Driver (PND) 74a with a Lower Communications Facilities Layer Process (LCFLP) 78 and one or more associated Hardware Element (HE)-Input/Output Devices (IODs) 58c is implemented as a Second System Process (SSP) 82.

Executive Program Tasks (EXP Tasks) 28, Tasks 30, Upper Communications Facilities Layers (UCFLs) 52a, and INTERPRETER 72 may therefore communicate among themselves and interoperate according to the conventions of First System 10, so that Executive Program Tasks (EXP Tasks) 28, Tasks 30, Upper Communications Facilities Layers (UCFLs) 52a, and INTERPRETER 72 appear to one another to be native First System 10 tasks and may therefore execute among themselves as if they were in fact executing on First System 10. In this regard, it must be remembered that INTERPRETER 72 emulates First System 10's central processing unit and memory and thus appears to Executive Program Tasks (EXP Tasks) 28, Tasks 30, and Upper Communications Facilities Layers (UCFLs) 52a to be First System 10's central processing unit and memory.

At the same time, First System Process (FSP) 80 may communicate and interoperate with the other processes executing in Second System 54, such as Second System Processes (SSPs) 82, according to the conventions of the UNIX based operating system executing in Second System 52 and thereby appear to Second System 52 to be native Second System 52 user processes.

As also indicated in FIG. 2, First System Process (FSP) 80, which includes Executive Program Tasks (EXP Tasks) 28 and Tasks 30 being executed on behalf of Application Programs (APPs) 22 and System Administrative Programs (SADs) 24, Upper Communications Facilities Layers (UFCLS) 52a with Pseudo Network Layer (PNL) 74a, and INTERPRETER 72, and Second System Processes (SSPs) 82 all execute within User Level 62 of Second System 54, so that First System Process (FSP) 80 and the Second System Processes (SSPs) 82 appear to Second System 54 to be Second System 54 user level processes. The interface between the First System 10 operations and functions that are being emulated on Second System 54 and the native operations and functions of Second System 54 which are used by the emulated elements of First System 10 thereby occurs at the boundary between Second System 54's User Level 62 and Second System 54's Kernel Level 64.

In summary, therefore, the present invention implements the emulated operations and functions of First System 10 in such a manner that the emulated operations and functions of First System 10 may interoperate among themselves in the same manner as in First System 10 and, therefore, effectively within the First System 10 native environment. At the same time, the processes in which the emulated First System 10 operations and functions are executing and the processes emulating First System 10 input/output operations are native Second System 54 processes, and thus may interoperate with one another and with other processes native to Second System 54 in a manner which is native to Second System 54.

In addition, the interface between the emulated First System 10 functions and operations and the native Second System 54 processes and functionality falls at the boundary between Second System 54's user level processes and kernel level processes and thus at a well defined interface so that the functional integrity of Second System 54's architecture is preserved.

As such, the method of emulation of the present invention retains unchanged the most significant aspects of the functionality of both the emulated and the emulating systems and places the interface between the emulated and emulating systems at a clearly defined and controlled boundary so that the interface between the emulated and emulating systems is substantially simplified and the functional and operational integrity of both systems is preserved.

C. Emulator Executive Level (EEXL) 68, Memory Queues, and the Memory Queue Interface (FIG. 3)

1. General Description of Emulator Executive Level (EEXL) 68 and Shared Memory Space Mechanisms Referring to FIG. 3, therein is presented a diagrammatic representation of the structures and mechanisms of Emulator Executive Level (EEXL) 68, a representative First System Process (FSP) 80 and Second System Kernel Level (SKernel) 64 with Second System Kernel Processes (SKPs) 66, concentrating upon the Emulator Executive Level (EEXL) 68 structures and mechanisms comprising the bridge and interface between First System Process (FSP) 80 and Second System Kernel Level (SKernel) 64 and, in particular, Pseudo Device Drivers (PSDDs) 74. The other data structures and mechanisms of First System Process (FSP) 80, Emulator Executive Level (EEXL) 68 and Second System Kernel Level (SKernel) 64 will be understood with reference to FIGS. 1 and 2. As described further in following descriptions of the present invention, Emulator Executive Level (EEXL) 68 resides in a UNIX Memory Space of Second System Hardware Platform Level (SHPL) 56's physical Memory 58b and is accessible to the mechanisms of Second System Kernel Level (SKernel) 63.

2. Memory Queue Interface and Queues

Figure 3:
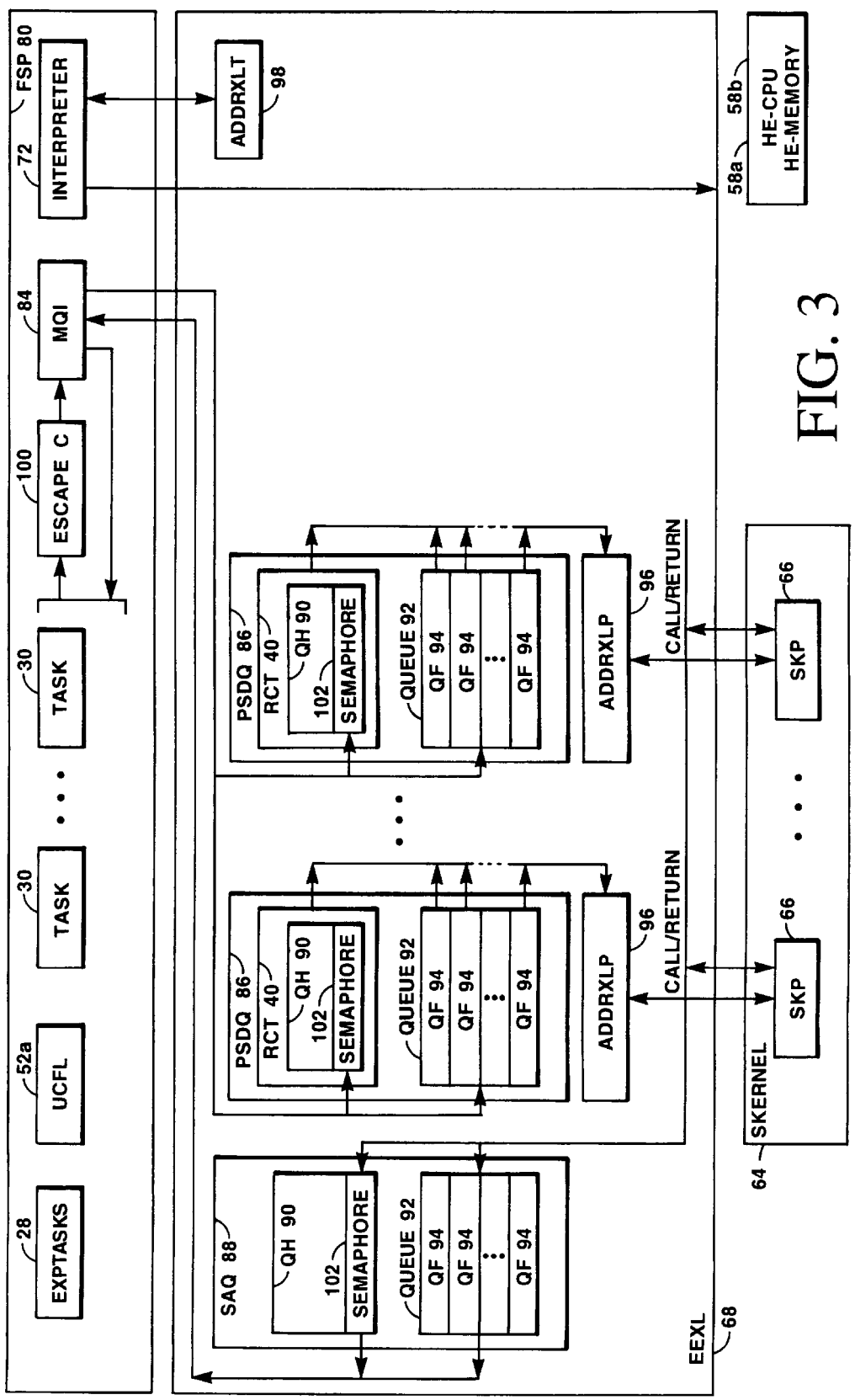
FIG. 3 presents details of the pseudo device driver mechanisms of the present invention.

As represented in FIG. 3, the bridge mechanisms and structures between First System Process (FSP) 80 and Emulator Executive Level (EEXL) 68 include a Memory Queue Interface (MQI) 84 residing in Emulator Executive Level (EEXL) 68 and executing in each First System Process (FSP) 80, and a plurality of Pseudo Device Queues (PSDQs) 86 and a single Software Active Queue (SAQ) 88, which together comprise the Pseudo Device Drivers (PSDDs) 74 shown in FIG. 2. Each Pseudo Device Driver (PSDD) 74 includes a corresponding Pseudo Device Queue (PSDQ) 86 and the Pseudo Device Drivers (PSDDs) 74 together share the single Software Active Queue (SAQ) 88 and Memory Queue Interface (MQI) 84. Although not represented explicitly in FIG. 3, the linked communication layer path will, as described, also include a queue mechanism comprised of a Pseudo Device Driver (PSDD) 74 in Pseudo Network Driver (PND) 76b wherein that Pseudo Device Driver (PSDD) 74 will also include a Pseudo Device Queue (PSDQ) 86 and a shared portion of Software Active Queue (SAQ) 88 and Memory Queue Interface (MQI) 84. The following will therefore discuss the structure and operations of Pseudo Device Drivers (PSDDs) 74 generically, with the understanding that the following discussion applies to all of the input/output paths emulated in Second System 54, including the layered communications facilities.

As previously described, each Pseudo Device Driver (PSDD) 74 in the path of linked communications layers represents and corresponds to a device or driver or communication link used by First System 10, that is, that existed in the First System Operating System Levels (FOSL) 14 and Hardware Platform Level (HPL) 20 of First System 10, and there is a Second System Kernel Process (SKP) 66 or a Lower Communications Facilities Layer Process (LCFLP) 78 in Second System Kernel Level (SKernel) 64 for and corresponding to each such device, driver or communication link. According to the present invention, each Pseudo Device Driver (PSDD) 74 or Lower Communications Facilities Layer Process (LCFLP) 78 is to operate in the same manner as the corresponding element that existed in First System 10.

That is, the Tasks 30 and Executive Program Tasks (EXP Tasks) 28 executing in First System Executive Level (FEXL) 16 will provide requests for operations to Emulator Executive Level (EEXL) 68, and thus to Second System Kernel Level (SKernel) 64 and Second System Hardware Platform Level (SHPL) 56, in the form of Indirect Request Block Pointers (IRBPs) 36p or Input/Output Request Block Pointers (IORBPs) 38p and will receive back the results of the operations. Emulator Executive Level (EEXL) 68 must therefore provide a path by which requests are passed to Second System Kernel Processes (SKPs) 66 and Lower Communications Facilities Layer Processes (LCFLPs) 78 and a path by which the results of the operations are passed back to the Tasks 30.

3. Implementation of Device Drivers and Link Layers

As described briefly above, each Pseudo Device Driver (PSDD) 74 utilizes a Pseudo Device Queue (PSDQ) 86 and shares the common Software Active Queue (SAQ) 88 with other Pseudo Device Drivers (PSDDs) 74 by executing the functions provided in Memory Queue Interface (MQI) 84 wherein Memory Queue Interface (MQI) 84 is a set of routines for accessing and managing the Pseudo Device Queues (PSDQs) 86 and the Software Active Queue (SAQ) 88.

The Pseudo Device Queue (PSDQ) 86 of each Pseudo Device Driver (PSDD) 74 forms the path by which requests for operations are passed to the appropriate Second System Kernel Processes (SKPs) 66 and Lower Communications Facilities Layer Processes (LCFLPs) 78 of Second System Kernel Level (SKernel) 64, wherein each Pseudo Device Queue (PSDQ) 86 is a path to a corresponding Second System Kernel Process (SKP) 66 or Lower Communications Facilities Layer Process (LCFLP) 78 and thus to a corresponding emulated device, driver or link layer. Software Active Queue (SAQ) 88, in turn, which is shared by each of the Pseudo Device Drivers (PSDDs) 74 and Lower Communications Facilities Layer Processes (LCFLPs) 78 and their corresponding Second System Kernel Processes (SKPs) 66, forms the path by which the results of Second System Kernel Process (SKP) 66 operations are passed back to the requesting tasks executing in First System Executive Level (FEXL) 16.

4. Internal Structure of Pseudo Device Queues (PSDQs) 88 and Software Active Queue (SAQ) 88

The Pseudo Device Queues (PSDQs) 86 are each comprised of a Header structure and a queue structure wherein the Header structure is embedded in a Resource Control Table (RCT) 40, as described above with reference to FIG. 1. Software Active Queue (SAQ) 88 is similarly comprised of a Header structure and a queue structure, wherein the Header structure resides in system memory space at a predetermined location. The general structure of the Queue Headers (QHs) 84 is the same for Software Active Queue (SAQ) 88 and for each of the Pseudo Device Queues (PSDQs) 86, but the information contained in the queue will depend upon the type of the particular queue, as will be described below.

Figure 4:
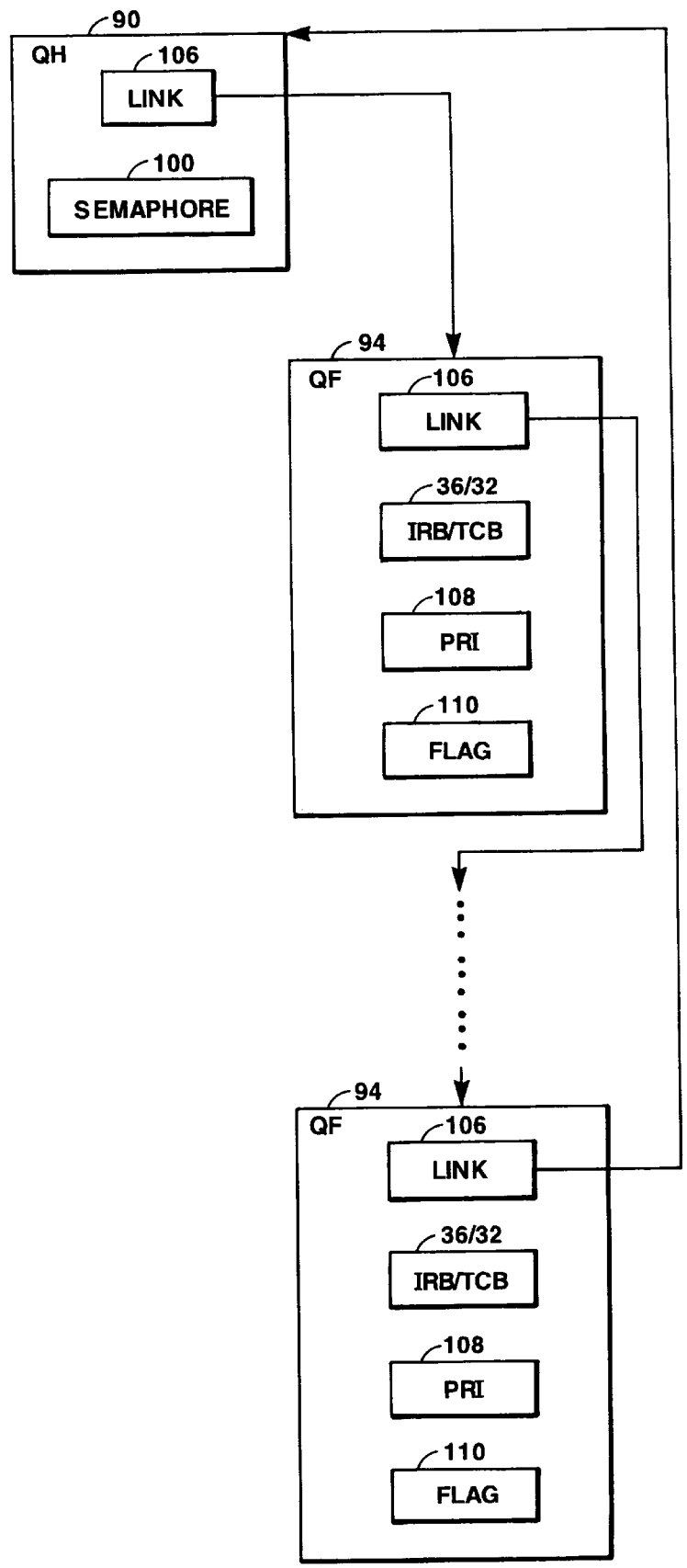
FIG. 4 presents the internal structure of the queues of the emulation mechanisms of the present invention.

As shown in FIG. 4, the queue structure associated with each Queue Header (QH) 90 is represented as a Queue 92 wherein each Queue 92 is a linked queue of Queue Frames (QFs) 94 wherein, as will be described in further detail in a following discussion and figure, each Queue Frame (QF) 94 may contain a Task Control Block (TCB) 32 or an Indirect Request Block Pointer (IRBP) 36p wherein each Task Control Block (TCB) 32 or Indirect Request Block Pointer (IRBP) 36p represents a request for an operation by a Task 30, as described above with reference to FIG. 1. The number of Queue Frames (QFs) 94 in any Queue 92 will depend upon the number of outstanding requests to the corresponding emulated device or, in the case of Software Active Queue (SAQ) 88, the number of completed requests, as described below.

The queue of each of Software Active Queue (SAQ) 88 and the Pseudo Device Queues (PSDQs) 86 comprises a structure referred to as a "linked queue with head node" wherein the Queue Header (QH) 90 comprises the head node and wherein the Queue Header (QH) 90 and the Indirect Request Blocks (IRBs) 34 in a Queue 92 are each linked to the following element in the queue.

5. Addresses and Address Translation

It will be noted, as described previously, that Software Active Queue (SAQ) 88, the Pseudo Device Queues (PSDQs) 86, and INTERPRETER 72 are provided to emulate the corresponding mechanisms of First System 10, that is, First System 10's input/output devices and central processing unit, as seen by Executive Program Tasks (EXP Tasks) 28 and Tasks 30. As such, Executive Program Tasks (EXP Tasks) 28 and Tasks 30 will provide memory addresses to the Pseudo Device Queues (PSDQs) 82 and INTERPRETER 72 according to the requirements of the native memory access and management mechanisms of First System 10 and will expect to receive memory addresses from Software Active Queue (SAQ) 88 and INTERPRETER 72 in the same form. Second System Kernel Processes (SKPs) 66, Lower Communications Facilities Layer Processes (LCFLPs) 78, the hardware elements of Second System 54 and other processes executing as native processes in Second System 54, however, operate according to the memory addressing mechanisms native to Second System 54. As such, address translation is required when passing requests and returning requests between Emulator Executive Level (EEXL) 68 and Second System Kernel Level (SKernel) 64.

As described, INTEPRETER 70 is provided to interpret First System 10 instructions into functionally equivalent Second Second 54 instructions, or sequences of instructions, including instructions pertaining to memory operations. As such, the address translation mechanism is also associated with INTERPRETER 72, or is implemented as a part of INTERPRETER 72, and is indicated in FIG. 3 as Address Translation (ADDRXLT) 98 and will be described in detail in a following discussion.

6. Operation of Memory Queue Interface (MQI) 84, Pseudo Device Queues (PSDQs) 86, and Software Active Queue (SAQ) 88

A task executing in First System Executive Level (FEXL) 16, that is, a Task 30 or one of Executive Program Tasks (EXP Tasks) 28 executing in First System Process (FSP) 80, may request the execution of an operation by a device emulated through Emulator Executive Level (EEXL) 68, Second System Kernel Level (SKernel) 64, and Second System Hardware Platform Level (SHPL) 56 by generating, or causing an Executive Program Task (EXP Task) 28 task to generate, an Indirect Request Block (IRB) 36 as in the normal, native operation of First System 10. The Task 30 or EXP Task 28 generating the Indirect Request Block (IRB) 36 will then, however, write the Indirect Request Block Pointer (IRBP) 36p into the Pseudo Device Queue (PSDQ) 86 corresponding to the appropriate device, driver or link layer by "escaping" to Emulator Executive Level (EEXL) 68 and issuing a call to Memory Queue Interface (MQI) 84. As shown in FIG. 3, this operation is performed through Escape/Call Mechanism (EscapeC) 100, which detects and traps input/output instructions and, in response to an input/output instruction, invokes Memory Queue Interface (MQI) 74 rather than, as in First System 10, passing the Indirect Request Block (IRB) 34 through one of the mechanisms described with reference to FIG. 1. Memory Queue Interface (MQI) 84 then writes the corresponding Indirect Request Block Pointer (IRBP) 36p into the corresponding Pseudo Device Queue (PSDQ) 86, which resides in the Emulator Executive Level (EXL) 68 operating environment. Thereafter, and as described further below, communication and interoperation between the Pseudo Device Queues (PSDQs) 86, Software Active Queue (SAQ) 88, and the Second System Kernel Processes (SKPs) 66, all of which are Second System 52 structures and processes, will be by conventional process calls and returns.

Referring briefly to the discussion of First System 10 in FIG. 1 and, in particular, the mechanisms by which Tasks 30 pass Indirect Request Block (IRB) 36 requests to I/O Level 18, it will be apparent that, except for the request call accordingly being to Memory Queue Interface (MQI) 84 rather than to the corresponding First System 10 mechanisms and escape to native Second System 54 code, the operations within First System Process (FSP) 80 to invoke the emulation of an input/output operation are very similar to the native operations of First System 10. The emulation call mechanism of Escape/Call Mechanism (EscapeC) 100 and Memory Queue Interface (MQI) 84 therefore closely emulates the operation of First System 10 in this regard and the modifications to First System Executive Level (FEXL) 16 are relatively slight, primarily being the addition of Escape/Call Mechanism (EscapeC) 100 and Memory Queue Interface (MQI) 84.

Further in this regard, it should be noted that Memory Queue Interface (MQI) 84 must be implemented in the Second System 54 operating environment, that is, in Emulator Executive Level (EEXL) 68, as a routine available to a plurality of Second System 54 processes.

It should be further noted that Pseudo Device Queues (PSDQs) 86 and Software Active Queue (SAQ) 88 are data structures of a form that is similar to the data structures already in use by First System Executive Level (FEXL) 16, so that the implementation of Memory Queue Interface (MQI) 84 and Escape/Call Mechanism (EscapeC) 100 as Second System 54 programs is, as regards the interface between Escape/Call Mechanism (EscapeC) 100 and Memory Queue Interface (MQI) 84, a well understood process.

Returning to the discussion of the emulation of a requested input/output operation, upon being called by a First System Process (FSP) 80 task issuing a request for an operation by an emulated device, driver or link layer, Memory Queue Interface (MQI) 84 will enqueue the Indirect Request Block Pointer (IRBP) 36p of the request into the Queue 92 of the Pseudo Device Queue (PSDQ) 86 corresponding to the emulated device, driver or link layer and, in doing so, will set a Semaphore 102 in the Queue Header (QH) 90 of the Pseudo Device Queue (PSDQ) 86.

As has been described, the Second System 54 upon which First System 10 is emulated is, in the present example, a UNIX based system and the Semaphore 102 is correspondingly a UNIX semaphore which, as indicated in FIG. 3, operates to wake up the Second System Kernel Process (SKP) 66 or Lower Communications Facilities Layer Process (LCFLP) 78 which emulates the requested device, driver or link layer driver in the manner well known to those of skill in the art and familiar with UNIX based systems. It should be noted that the Semaphores 102 also operate to lock a queue that an entry is being written into so that another process will not attempt to write into or read from the queue while the queue is being modified by a first process, such as Memory Queue Interface (MQI) 84 or a Second System Kernel Process (SKP) 66.

The writing of an Indirect Request Block Pointer (IRBP) 36p into the Queue 92 of a Pseudo Device Queue (PSDQ) 86 will thereby cause a conventional UNIX call and return in which the Second System Kernel Process (SKP) 66 or Lower Communications Facilities Layer Process (LCFLP) 78 performs the requested operation. That is, and as indicated in FIG. 3, the setting of the Semaphore 102 in a Pseudo Device Queue (PSDQ) 86 results in a process call to the Second System Kernel Process (SKP) 66 or Lower Communications Facilities Layer Process (LCFLP) 78 which is emulating the corresponding device, driver or link layer driver to which the request was directed by the requesting task. The Second System Kernel Process (SKP) 66 or Lower Communications Facilities Layer Process (LCFLP) 78 will then access and read the Indirect Request Block Pointer (IRBP) 36p of the request and, operating through the Indirect Request Block (IRB) 36, will obtain the information necessary to execute the requested operation. The Second System Kernel Process (SKP) 66 or Lower Communications Facilities Layer Process (LCFLP) 78 will execute the requested operation through the corresponding hardware elements of Second System Hardware Platform Level (SHPL) 56 and, upon completing the operation, will return the results of the operation to Software Active Queue (SAQ) 88 and, when doing so, will set the Semaphore 102 in the Queue Header (QH) 90 of Software Active Queue (SAQ) 88.

It will therefore be apparent from the above that the design of such Second System Kernel Processes (SKPs) 66 and of Lower Communications Facilities Layer Processes (LCFLPs) 78 will be well familiar to those of skill in the art, so that a detailed description of the design of such Second System Kernel Processes (SKPs) 66 and Lower Communications Facilities Layer Processes (LCFLPs) 78 is not necessary for those of skill in the art to implement the present invention and, since the lower level details of such designs would differ for each First System 10 and Second System 54, would be superfluous to understanding the present invention.

7. Further Description of Queue Headers (QHs) 90 and Queues 92 (FIG. 4, Tables 1, 2, 3 and 4)

Referring to FIG. 4, therein is represented the Queue Header (QH) 90 and Queue 92 of Software Active Queue (SAQ) 88 or a Pseudo Device Driver Queue (PSDQ) 86 in further detail. As indicated therein, and as described previously, each Queue Header (QH) 90 includes, in addition to a Semaphore 102, a Link 106 indicating the location of the first Queue Frame (QF) 94 in the associated Queue 92. Each Queue Frame (QF) 94, in turn, includes a Link 106 to the next Queue Frame (QF) 94 of the Queue 92, with the Link 106 of the last Queue Frame (QF) 94 containing a pointer back to the location of the Queue Header (QH) 90.

The Queue Frames (QFs) 94 of Software Active Queue (SAQ) 88 and Pseudo Device Driver Queues (PSDQs) 86 differ in detail and the following will describe the Queue Frames (QFs) 94 of both, noting where the frames differ. Each Queue Frame (QF) 94 further includes a Task Control Block Pointer (TCBP) or Input/Output Request Block Pointer (IORBP) 38p, as previously described, a Priority Field (Priority) 108 containing a value indicating the relative priority of the interrupt or request. The Queue Frames (QFs) 94 of Software Active Queue (SAQ) 88 include a Flag Field (Flag) 108 containing a flag which distinguishes whether the Queue Frame (QF) 94 contains a Task Control Block (TCB) 32 or an Indirect Request Block (IRB) 36. Input/Output Request Blocks (IORBs) through their IRBs are generally given a higher priority than Task Control Blocks (TCBs). Exceptions may be made, however, for example, for clock and task inhibit Task Control Blocks (TCBs) 32, which must be given the highest priority.

The structure and operation of Memory Queue Interface (MQI) 84, Software Active Queue (SAQ) 88, Pseudo Device Queues (PSDQs) 86, and Second System Kernel Processes (SKPs) 66 and Lower Communications Facilities Layer Processes (LCFLPS) 78 may be understood further by an examination of the further data stored in Queue Headers (QHs) 90, which comprises information used in the operations of Tasks 30, Executive Program Tasks (EXP Tasks) 28, Memory Queue Interface (MQI) 84, and Second System Kernel Processes (SKPs) 66 and Lower Communications Facilities Layer Processes (LCFLPS) 78, either directly or as pointers and addresses to other data structures which contain the necessary information.

The Queue Headers (QHs) 90 of the Pseudo Device Queues (PSDQs) 86 have a standardized format and structure and the Queue Headers (QHs) 90 of the various queues of Emulator Executive Level (EEXL) 68 essentially differ only with respect to the specific information stored in this standardized format and structure and the manner in which this information is used. As such, the following will first describe the basic structure and format of a Queue Header (QH) 90 and will then illustrate a specific example of the Queue Header (QH) 90 for the Pseudo Device Queue (PSDQ) 86 of an exemplary emulated device, such as a disk drive, and for an XTD/TTY device which does not use the Semaphore 84 for sleep/waken control.

As illustrated in Tables 1, 2, 3 and 4, a basic Queue Header (QH) 90 contains the following fields and information and the information in the fields is used as described in the following. It should be noted that not all of the fields are necessarily used in a given Queue Header 84 and that certain fields, not shown below, are reserved for future use.

TABLE 1

Basic Queue Header 90

| | |
|---|---|
| (MQI)->rqh.priority | Contains relative priority of request; appears in Indirect Request Block (IRB) but listed here for convenience. |
| (MQI)->rqh.fwd | Pointer to next queue element or to header if queue is empty. |
| (MQI)->mcl_ctr | Frequency of monitor calls in session. |
| (MQI)->cxt_ctr | Frequency of context swaps in session; that is, frequency of switching between Tasks 30. |
| (MQI)->isem.sid | Semaphore to lock queue structure while referencing queue structure to access (IRB) or to write or delete (IRB); used to sleep/wake SKPs 66 or to generate signal to call certain SKPs 66 such as XTD devices. |
| (MQI)->isem.pid | Server process identification. |
| (MQI)->fdes | File descriptor. |

TABLE 1-continued

Basic Queue Header 90

| | |
|---|---|
| (MQI)->active_servers | TRUE if corresponding server SKP 66 is active. |
| (MQI)->status | Current state of terminal. |
| (MQI)->usr_sid | User terminal semaphore identification. |
| (MQI)->req_cnt | Number of requests currently enqueued. |
| (MQI)->enq_cnt | Total enqueue operations to current time. |
| (MQI)->deq_cnt | Total dequeue operations to current time. |
| (MQI)->slp_cnt | Total sleep operations to current time. |
| (MQI)->wak_cnt | Total waken operations to current time. |
| (MQI)->func | Pointer to function SKP 66. |
| (MQI)->block | Shared memory address of strucure (Task, (TCB), (IORB). |
| (MQI)->pid | Process identification; depends upon specific queue. |
| (MQI)->cur_pri | Priority of queue frame (IRB) most recently dequeued. |
| (MQI)->lrn | Logical resource number (resource identifier) of emulated device. |
| (MQI)->brk-add | Location of temporary storage of SKP 66 during break processing. |
| (MQI)->trmname | Name of user terminal. |
| (MQI)->logname | Log-in name of user. |
| (MQI)->display | Display variable of user. |
| (MQI)->filename | File name of emulated device to be mounted. |

TABLE 2

Queue Header for Software Active Queue (SAQ) 88
Note: SAQ 88 Header is not an RCT 40 Header

| | |
|---|---|
| (SAQ)->rqh.priority | N/A (Not Applicable). |
| (SAQ)->rqh.fwd | Pointer to next queue element or to header if queue is empty. |
| (SAQ)->mcl_ctr | Frequency of monitor calls in session. |
| (SAQ)->cxt_ctr | Frequency of context swaps in session; that is, frequency of switching between Tasks 30. |
| (SAQ)->isem.sid | Semaphore to lock queue structure while referencing queue structure to access (IRB) or to write or delete (IRB); used to sleep/wake on when element added to queue. |
| (SAQ)->isem.pid | Server process identification (MQI). |
| (SAQ)->fdes | N/A |
| (SAQ)->active_servers | N/A |
| (SAQ)->status | N/A |
| (SAQ)->usr_sid | N/A |
| (SAQ)->req_cnt | Number of requests currently enqueued. |
| (SAQ)->enq_cnt | Total enqueue operations to current time. |
| (SAQ)->deq_cnt | Total dequeue operations to current time. |
| (SAQ)->slp_cnt | Total sleep operations to current time. |
| (SAQ)->wak_cnt | Total waken operations to current time. |
| (SAQ)->func | N/A |
| (SAQ)->block | N/A |
| (SAQ)->pid | Process identification; clock server process of FEXP 16. |
| (SAQ)->cur_pri | Priority of queue frame (TCB) most recently dequeued. |
| (SAQ)->lrn | N/A |
| (SAQ)->brk-add | N/A |
| (SAQ)->trmname | N/A |
| (SAQ)->logname | N/A |
| (SAQ)->display | N/A |
| (SAQ)->filename | N/A |

TABLE 3

Queue Header 90 for Disk/Diskette

| | |
|---|---|
| (RCT)->qaddr.rqh.priority | N/A |
| (RCT)->qaddr.rqh.fwd 94 | Pointer to next queue element or to header if queue is empty. |
| (RCT)->qaddr.mcl_ctr | N/A |

TABLE 3-continued

Queue Header 90 for Disk/Diskette

| | |
|---|---|
| (RCT)->qaddr.cxt_ctr | N/A |
| (RCT)->qaddr.isem.sid | Semaphore to lock queue structure while referencing queue structure to access (IRB) or to write or delete (IRB); used to sleep/wake on when element added to queue |
| (RCT)->qaddr.isem.pid | Server process identification SKP 66 of disk/diskette. |
| (RCT)->qaddr.fdes | File descriptor. |
| (RCT)->qaddr.active_servers | TRUE if corresponding server SKP 66 is active. |
| (RCT)->qaddr.status | N/A |
| (RCT)->qaddr.usr_sid | N/A |
| (RCT)->qaddr.req_cnt | Number of requests currently enqueued. |
| (RCT)->qaddr.enq_cnt | Total enqueue operations to current time. |
| (RCT)->qaddr.deq_cnt | Total dequeue operations to current time. |
| (RCT)->qaddr.slp_cnt | Total sleep operations to current time. |
| (RCT)->qaddr.wak_cnt | Total waken operations to current time. |
| (RCT)->qaddr.func | Pointer to function SKP 66. |
| (RCT)->qaddr.block | Shared memory address of structure (Task, (TCB), (IORB)). |
| (RCT)->qaddr.pid | N/A |
| (RCT)->qaddr.cur_pri | Priority of queue frame (IRB) most recently dequeued. |
| (RCT)->qaddr.lrn | Logical resource number (resource identifier) of emulated device. |
| (RCT)->qaddr.brk-add | N/A |
| (RCT)->qaddr.trmname | N/A |
| (RCT)->qaddr.logname | N/A |
| (RCT)->qaddr.display | N/A |
| (RCT)31 >qaddr.filename | File name of emulated device to be mounted. |

TABLE 4

Queue Header 90 for XTD/TTY Device

| | |
|---|---|
| xtd->rqh.priority | N/A |
| xtd->rqh.fwd | Pointer to next queue element or to header if queue is empty. |
| xtd->mcl_ctr | N/A |
| xtd->cxt_ctr | N/A |
| xtd->isem.sid | Semaphore to lock queue structure while referencing queue structure. |
| xtd->isem.pid | N/A |
| xtd->fdes | File descriptor for xtd socket. |
| xtd->active_servers | TRUE if corresponding server SKP 66 is active. |
| xtd->status | N/A |
| xtd->usr_sid | N/A |
| xtd->req_cnt | N/A |
| xtd->enq_cnt | Total enqueue operations to current time. |
| xtd->deq_cnt | Total dequeue operations to current time. |
| xtd->slp_cnt | N/A |
| xtd->wak_cnt | N/A |
| xtd->func | Pointer to function (xtd_io). |
| xtd->block | N/A |
| xtd->pid | Process identification of the xtd_io process. |
| xtd->cur_pri | Priority of queue frame (IRB) most recently dequeued. |
| xtd->lrn 126 | N/A |
| xtd->brk-add | N/A |
| xtd->trmname | N/A |
| xtd->logname | N/A |
| xtd->display | N/A |
| xtd->filename | N/A |

D. Shared Memory, Memory Management and Memory Protection (FIGS. 5, 6, 7 and 8)

As described above with reference to FIGS. 2 and 3, the First System 10 tasks and programs executing on Second System 54, Second System 54's native processes and mechanisms and the Second System 54 mechanisms emulating First System 10 mechanisms share and cooperatively use Second System 54's memory space in Second System Memory 58b. As a consequence, it is necessary for Second System 54, the First System 10 tasks and programs executing on Second System 54, and the emulation mechanisms to share memory use, management, and protection functions in a manner that is compatible with both Second System 54's normal memory operations and with First System 10's emulated memory operations. The emulation of First System 10 memory operations in Second System 54 in turn requires emulation of First System 10's memory management unit, that is, First System 10's hardware and software elements involved in memory space allocation, virtual to physical address translation, and memory protection in Second System 54. As described below, this emulation is implemented through use of Second System 52's native memory management unit to avoid the performance penalties incurred through a complete software emulation of First System 10's memory management unit.

As is well known, most systems operate upon the basis of virtual addresses and perform virtual to physical address translations relative to a predetermined base address, that is, by adding a virtual address as an offset address to the base address to determine the corresponding address in physical address space of the system. While First System 10 and Second System 52 may both use such addressing schemes, the actual addressing mechanisms of the two system may differ substantially, as may the memory protection schemes.

1. First System 10 Native Memory Mechanisms (FIGS. 5 and 6)

The native memory mechanisms of First System 10 implement a ring type protection system wherein Executive Program Tasks (EXP Tasks) 28 and Tasks 30 normally operate with two types of memory area respectively designated as a system memory area and user memory areas. The system areas are used for system level operations, such as the execution of executive level programs and the storage of the related data structures, while each user task executes operations and stores data associated with the execution of the task in a user memory area.

Each task is assigned to a given ring and the access permissions of a given task to information contained in a given memory space are determined by the respective assigned rings of the task and the ownership of the memory space, that is, whether the memory space is in the system memory area or in the user task memory area or areas. For example, system executive level tasks and operations, such as operating system functions executed by an EXP Task 28 are executed in ring 0 while Tasks 30 executing user operations are executed in higher order rings, such as rings 1, 2 and 3. As such, an EXP Task 28 executing in ring 0 will have read and write access privileges to data residing in the system memory area and read and write access privileges to user task data residing in the user task areas. User Tasks 30 will have read and write access privileges to user task data residing in selected user task areas but will have only read access privilege, at most, to data residing in the system area.

2. Mapping of First System 10 System Memory Area (SYSMEM) 110 and Independent-Memory Pool (IPOOL) 112 Areas into Second System 54 Memory Space (FIG. 5)

As will be described in further detail below and as illustrated in FIG. 5, First System 10 memory space as implemented in Second System 54 is organized as two types of regions, respectively indicated in FIG. 5 as the System Memory (SYSMEM) 110 area and the Independent-Memory Pool (IPOOL) 112 areas, which are accessed by two classes of tasks, that is, the executive level or operating system tasks and the user tasks. The access privileges of each class of task, as determined through the task ring numbers and memory area ownership, depends upon the class of the task and the ownership of the memory area being accessed, with executive tasks having read and write privileges to both the Independent-Memory Pool (IPOOL) 112 areas and the System Memory (SYSMEM) 110 area and the user tasks having read and write privileges to Independent-Memory Pool (IPOOL) 112 areas and read only privileges to the System Memory (SYSMEM) 110 area. The mapping of task access privileges onto First System 10's memory space as implemented in Second System 54's memory space is therefore a two dimensional process wherein one dimension is represented by the type of memory area, that is, whether a given memory area is the System Memory (SYSMEM) 110 area or an Independent-Memory Pool (IPOOL) 112, and the other dimension is represented by the class of the task, that is, whether a given task is an executive task or a user task.

As also described, Second System 54 in the described implementation of the invention is a AIX* based system, wherein AIX* is the International Business Machines Corporation version of the UNIX** operating system and wherein memory space is organized as AIX* type memory segments. It is necessary to map the memory access functions performed by First System 10's memory mechanisms onto Second System 54's memory space to accomplish the emulation of First System 10 on Second System 54 so that the First System 10 programs and tasks executing on Second System 54 may execute as if they were executing in the native First System 10 environment.

As illustrated in FIG. 6, each First System Virtual Address (FSVA) 126 is comprised of a Most Significant Bits field (MSB) 128 and an Address field (ADDR) 130 wherein Most Significant Bits field (MSB) 128 contains a bit field whose value identifies whether the address is directed to an executive memory area, that is, a system memory area, or to a user task memory area. For example, the Most Sigificant Bits field (MSB) 128 may contain the value 0000 (0) when the request is directed to the system memory area and the value 0001 (1) when the request is directed to a user task memory area.

The mapping of First System 10's memory management functions onto Second System 54's memory space and management functions is a two dimensional representation of First System 10's memory access functions as illustrated in FIG. 7 wherein the horizontal axis represents the class of the tasks requesting memory access, that is, executive task or user task, and the vertical axis represents the type of memory area, that is, the System Memory (SYSMEM) 110 area or an Independent-Memory Pool (IPOOL) 112 area. Each square represented in the two by two array of FIG. 6 thereby represents a combination, in First System 10, of a memory area and a class of task having access privileges to that area. The upper left square represents the combination of executive tasks with System Memory (SYSMEM) 110 area, the upper right square represents the combination of user tasks with System Memory (SYSMEM) 110 area, the lower left square represents the combination of executive tasks with Independent-Memory Pools (IPOOLs) 112 and the lower right square represents the combination of user tasks with Independent-Memory Pools (IPOOLs) 112.

The entries within each square of the two by two array represent, first, the number of the Second System segment to which the corresponding combination of First System memory area and class of task is mapped and, second, the access privileges of each combination of a class of First System 10 task and the corresponding First System 10 memory area. Thus it may be seen that the upper left square represents Second System 54 memory segment 3 and that First System 10 executive tasks have read and write privileges to segment 3 while the upper right square represents Second System 54 memory segment 4 and that First System 10 user tasks have read only privileges to segment 4. Second System 54 memory segments 3 and 4 thereby correspond to First System 10's System Memory (SYSMEM) 110 area but organized as two segments distinguished by the respective access privileges of First System 10's executive tasks and user tasks, wherein executive tasks have both read and write privileges to segment 3 while user tasks have only read privileges to segment 4.

In a like manner, Second System 54's memory segments 5 and 6 correspond to Independent-Memory Pools (IPOOLs) 112 and the First System 10 executive tasks and user tasks both have read and write access to these segments, just as First System 10 executive tasks and user tasks both have read and write access to Independent-Memory Pools (IPOOLs) 112. It should be noted that while segments 3 and 4 are distinguished by the respective access privileges of First System 10 executive and user tasks, segments 5 and 6 are not so distinguished because both the executive tasks and the user tasks have both read and write privileges to both segments, just as to Independent-Memory Pools (IPOOLs) 112. The mapping of Independent-Memory Pools (IPOOLs) 112 into two segments, that is, segments 5 and 6, is performed, however, to preserve symmetry with the mapping of System Memory (SYSMEM) 110 into segments 3 and 4, thereby simplifying the mapping of First System 10's memory access and management functions into Second System 54 as described below.

As represented in FIG. 5, System Memory (SYSMEM) 110 area and Independent-Memory Pools (IPOOLs) 112, indicated by the dashed line enclosures, are implemented in Second System 54's Hardware Element-Memory (HE-MEM) 58b in Segments 3, 4, 5 and 6 of Hardware Element-Memory (HE-MEM) 58b wherein there is, for each instance of an FSP 80 in Second System 54, a single instance of System Memory (SYSMEM) 110 area implemented as a matching pair of memory areas in Segments 3 and 4 and a plurality of Independent-Memory Pools (IPOOLs) 112, each implemented as a matching pair of memory areas in Segments 5 and 6 wherein each Independent-Memory Pool (IPOOL) 112 corresponds to a task actively executing in the instance of First System Process (FSP) 80.

As indicated in FIG. 5, the pair of memory areas comprising System Memory (SYSMEM) 110 area in Segments 3 and 4 is comprised of a System Memory Area Segment 3 (SMAS3) 132 "attached" from a System Memory Area Base Address 3 (SYSMEMBA3) 134 and a System Memory Area Segment 4 (SMAS4) 136 "attached" from a System Memory Area Base Address 4 (SYSMEMBA4) 138. In a like manner, the pair of memory areas comprising each Independent-Memory Pool (IPOOL) 112 is comprised of an Independent-Memory Pool Area Segment 5 (IPOOLS5) 140 area "attached" from an Independent-Memory Pool Base Address 5 (IPOOLBA5) 142 and an Independent-Memory Pool Area Segment 6 (IPOOLS6) 144 area "attached" from an Independent-Memory Pool Base Address 6 (IPOOLBA6) 146. While System Memory Area Base Address 3 (SYSMEMBA3) 134 and System Memory Area Base Address 4 (SYSMEMBA4) 138 are the same for all tasks executing within an FSP 80, Independent-Memory Pool Base Address 5 (IPOOLBA5) 142 and Independent-Memory Pool Base Address 6 (IPOOLBA6) 146 are different for each task actively executing in the FSP 80.

In correspondence with the memory protection scheme of First System 10, System Memory Area Segment 4 (SMAS4) 136 is attached from System Memory Area Base Address 4 (SYSMEMBA4) 138 with read only privilege while System Memory Area Segment 3 (SMAS3) 132 is attached from System Memory Area Base Address 3 (SYSMEMBA3) 134 with read and write privileges. In a like manner, each Independent-Memory Pool Area Segment 5 (IPOOLS5) 140 is attached from Independent-Memory Pool Base Address 5 (IPOOLBA5) 142 with read and write privileges and each Independent-Memory Pool Area Segment 6 (IPOOLS6) 144 is attached from Independent-Memory Pool Base Address 6 (IPOOLBA6) 146 with read and write privileges.

It must be noted that Second System 54 memory space, as organized under the AIX* operating system, is actually structured into 16 segments, of which certain segments are reserved, for example, to contain the AIX* operating system and system functions. More than four segments, that is, more segments than segments 3, 4, 5 and 6, are available for use by user processes executing Second System 54, however, and the mapping of First System 10 memory areas onto Second System 54 memory space may make use of these additional, available segments by a second mapping process performed by Pseudo Device Drivers (PSDDs) 74.

3. Emulation of First System 10 Memory Operations (FIG. 8)

Figure 8:
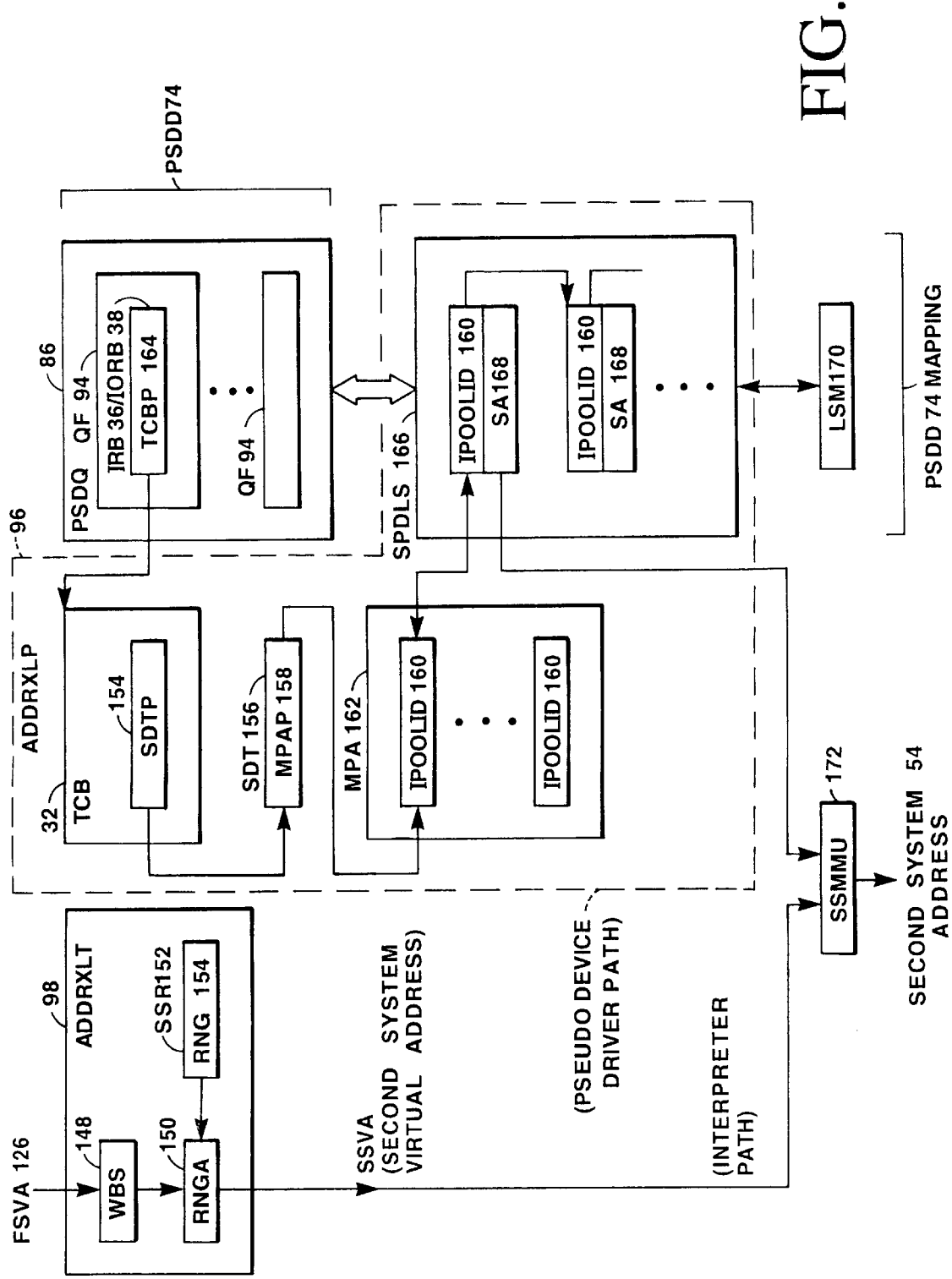

Referring to FIG. 8, and to FIGS. 2, 3, 5 and 6, therein is illustrated the mechanisms implemented on Second System 54 to emulate the memory access, protection, and management mechanisms of First System 10. It must be recognized in the following that the emulation of First System 10 memory operations on Second System 54 involves two differerent address conversion operations, one being the conversion of First System Virtual Addresses (FSVAs) 126 done by INTERPRETER 72 and the second being the conversion of First System Virtual Addresses (FSVAs) 126 done by Pseudo Device Drivers (PSDDs) 74. Each of these conversions is accomplished through translation and through mapping of First System 10 system and user memory areas into Second System 54 segments. The following will first describe the address translation operation performed by INTERPRETER 72, and then will describe the address translation operation performed by Pseudo Device Drivers (PSDDs) 74.

First considering the process of INTERPRETER 72 address translation, as has been described above, each First System Virtual Address (FSVA) 126 is comprised of a Most Significant Bits field (MSB) 128 and an Address field (ADDR) 130 wherein Most Sigificant Bits field (MSB) 128 contains a bit field whose value identifies whether the address is directed to an executive memory area, that is, System Memory (SYSMEM) 110 area, or to an Independent-Memory Pool (IPOOL) 112. For example, the Most Sigificant Bits field (MSB) 128 may contain the value 0000 (0) when the request is directed to the System Memory (SYSMEM) 110 area and the value 0001 (1) when the request is directed to an Independent-Memory Pool (IPOOL) 112 area.

As indicated in FIG. 8, the First System Vial Address (FSVA) 126 of a request which includes a memory access is provided to Address Translation (ADDRXLT) 98. Address Translation (ADDRXLT) 98 includes a Word To Byte Shifter (WBS) 148 which performs an initial translation of the First System Virtual Address (FSVA) 126 from the First System 10 format, in which addresses are on a per word basis, to a Second System 54 virtual address, in which addresses are on a per byte basis. This translation is performed by a left shift of the First System Virtual Address (FSVA) 126 and, in the translation and as indicated in FIG. 7, the value in the Most Sigificant Bits field (MSB) 128 field of the First System Virtual Address (FSVA) 126 is transformed from 0000 (0) or 0001 (1) to 0000 (0) or 0010 (2), respectively.

Having performed the translation of a First System Virtual Address (FSVA) 126 into a per byte address, Address Translation (ADDRXLT) 98's Ring Adder (RNGA) 150 will read a System Status Register (SSR) 152 which, among other information, contains a Ring Number (RNG) 154 which contains a value indicating the First System 10 ring in which the task is executing, that is, a value of 0, 1, 2 or 3. As described, Ring 0 is reverved for system operations while Rings 1, 2 and 3 are used for user tasks. If the task is executing in Ring 0, that is, in system space, Ring Adder (RNGA) 150 will add 3 to the value (0 or 2) contained in Most Significant Bits field (MSB) 128 of the shifted First System Virtual Address (FSVA) 126. If the task is not executing in Ring 0, that is, is executing in Rings 1, 2, or 3 and thus in user task space, Ring Adder (RNGA) 150 will add 4 to the value (0 or 2) contained in Most Significant Bits field (MSB) 128 of the shifted First System Virtual Address (FSVA) 126. The final result will be a byte oriented First System Virtual Address (FSVA) 126 having a Most Significant Bits field (MSB) 128 which contains a value of 3, 4, 5 or 6, thereby indicating the Second System 54 memory space segment in which the address lies and an Address (ADDR) field 130 identifying a location within the segment.

Next considering the process of INTERPRETER 72 mapping of First System 10 system and user task memory areas into Second System 54 memory segments, it has been described that First System 10 operating system tasks and functions execute in a region referred to herein as System Memory (SYSMEM) 110 area while user tasks execute in regions referred to herein as Independent-Memory Pools (IPOOLs) 112 area and that these memory regions are mapped into Second System 54 memory segments. INTERPRETER 72 segment mapping is performed when there is a change of the Task Control Blocks (TCBs) 32 whose code is being interpreted. A Task Control Block (TCB) 32 contains a Segment Descriptor Pointer (SDP) 154 to a Segment Descriptor Table (SDT) 156 associated with the task. Each Segment Descriptor Table (SDT) 156 in turn contains a Memory Pool Array Pointer (MPAP) 158 which in turn points to an Independent Memory Pool Identifier (MPID) 160 in a Memory Pool Array (MPA) 162. When the Independent Memory Pool Identifier (MPID) 160 of a new Task Control Block (TCB) 32 differs from the previous Independent Memory Pool Identifier (MPID) 160 of the previojus Task Control Block (TCB) 32, the segments 5 and 6 are detached from INTERPRETER 72 and the new Independent Memory Pool Area is attached as segments 5 and 6.

The INTERPRETER 72 translation process always generates adddresses in segments 5 and 6 for user task addresses, but because of dynamic detaching and attaching of Independent Memory Pools (IPOOLs) 112, the same addresses will refer to different Independent Memory Pools (IPOOLs) 112. The mapping of system memory areas remains the same, however, when switching from Task Control Block (TCB) 32 to Task Control Block (TCB) 32, so that the INTERPRETER 72 generated addresses in segments 3 and 4 always refer to the same locations.

The address conversion done by Pseudo Device Drivers (PSDDs) 74 differs from the address conversion done by INTERPRETER 72 in that it maps all the system memory address into segment 3 whereas user task addresses, depending on the Independent Memory Pool (IPOOL) 112 involved, could be mapped in any of segments 4 onwards.

Referring again to FIG. 8, therein is represented a Pseudo Device Driver Queue (PSDQ) 86 wherein each Pseudo Device Driver Queue (PSDQ) 86 is a part of a Pseudo Device Driver (PSDD) 74 and is associated with a corresponding Second System Kernel Process (SKP) 66 as described with reference to FIGS. 3 and 4. One of the Pseudo Device Driver Queues (PSDQs) 86 and its associated addressing structures and mechanisms is shown in partial detail for purposes of the following discussions. Further details of the structure and operations of Pseudo Device Drivers (PSDDs) 74 and Pseudo Device Driver Queues (PSDQs) 86 may be found in reference to the discussions regarding FIGS. 3 and 4.

As has been described, each Pseudo Device Driver Queue (PSDQ) 86 is associated with a corresponding Second System Kernel Process (SKP) 66 which executes the requests in the Pseudo Device Driver Queue (PSDQ) 86 and any Pseudo Device Driver Queue (PSDQ) 86 may contain requests from a plurality of tasks, each task in turn being associated with and executed in an Independent-Memory Pool (IPOOL) 112 area which is mapped into a Second System 54 memory segment by address translator (ADDRXLP) 96 which includes a Server Pool Descriptor Linked Set (SPDLS) associated with the Pseudo Device Driver Queue (PSDQ) 86, Task Control Block (TCB) 32, Segment Descriptor Table 156, and Memory Pool Array 162.

As described previously, each Pseudo Device Driver Queue (PSDQ) 86 contains Queue Frames (QFs) 94 which in turn contain the Indirect Request Blocks (IRBs) 36 passed from the First System tasks. Each Indirect Request Block (IRB) 36 in turn contains a Task Control Block Pointer (TCBP) 164 which points to the Task Control block (TCB) 32 associated with the task that generated the Indirect Request Block IRB 36.

As described, the Task Control Block (TCB) 32 contains a Segment Descriptor Pointer (SDP) 154 to a Segment Descriptor Table (SDT) 156 associated with the task. Each Segment Descriptor Table (SDT) 156 in turn contains a Memory Pool Array Pointer (MPAP) 158 which in turn points to an Independent-Memory Pool Identification entry (IPOOLID) 160 stored in the Memory Pool Array (MPA) 162. Each Pseudo Device Driver (PSDD) 74 maintains a Server Pool Descriptor Linked Set (SPDLS) 166 where the Independent Memory Pool Identification (IPOOLID) 160 is stored if currently attached by the Pseudo Device Driver (PSDD) 74.

In addition to the Independent Memory Pool Identification (IPOOLID) 160, the Server Pool Descriptor Linked Set (SPDLS) 166 also contains the Second System 54 Segment Address (SA) 168 where the Independent Memory Pool (IPOOL) 112 is attached. Unlike the instance of INTERPRETER 72, this Segment Address (SA) 168 may be anywhere from segment 4 onwards.

4. Management of Memory Space

As described above, in the present implementation of the emulation in Second System 54 each Second System Kernel Process (SKP) 66 of a Pseudo Device Driver 74 may have associated with it a plurality of Independent-Memory Pools (IPOOLs) 112, wherein the number of Independent-Memory Pools (IPOOLs) 112 associated with a Second System Kernel Process (SKP) 66 will be determined by the number of tasks for which the Second System Kernel Process (SKP) 66 has a request in its associated Pseudo Device Queue (PSDQ) 86.

As such, it is necessary to manage the Server Pool Descriptor Linked Set (SPDLS) 166 associated with each Second System Kernel Process (SKP) 66 to dynamically assign or reassign segments as required by the tasks having requests in the Pseudo Device Drivers (PSDDs) 74. For example, a Second System Kernel Process (SKP) 66 may be passed a request from a task whose Independent-Memory Pool (IPOOL) 112 is not among the set of Independent-Memory Pools (IPOOLs) 112 contained in the Server Pool Descriptor Linked Set (SPDLS) 166 associated with the Second System Kernel Process (SKP) 66, so that it is necessary to add the unattached Independent-Memory Pool (IPOOL) 112, corresponding to the task, to the Independent-Memory Pools (IPOOLs) 112 corresponding to the Pseudo Device Driver (PSDD) 74. In addition, it may be necessary to delete, or detach, one or more least recently used Independent-Memory Pools (IPOOLs) 112 from the Independent-Memory Pools (IPOOLs) 112 of the Server Pool Descriptor Linked Set (SPDLS) 166 in order to be able to attach a new Independent-Memory Pool (IPOOL) 112.

As indicated in FIG. 8, each Server Pool Descriptor Linked Set (SPDLS) 166 is managed by a Linked Set Manager (LSM) 168. A Pseudo Device Driver Queue (PSDQ) 86 receiving a request for a memory access will pass the identifier of its task to Linked Set Manager (LSM) 168. Linked Set Manager (LSM) 168 will determine whether an Independent-Memory Pool Identifier entry (IPOOLID) 160 corresponding to the task is in the Server Pool Descriptor Linked Set (SPDLS) 166 and, if it is, will reorder the linked set so that the Independent-Memory Pool Identifier entry (IPOOLID) 160 is at the head of the linked set by reordering the links connecting the Independent-Memory Pool Identifier entries (IPOOLIDs) 160, in the manner well known in the art. If the Server Pool Descriptor Linked Set (SPDLS) 166 does not contain an Independent-Memory Pool Identifier entry (IPOOLID) 160 corresponding to the task, Linked Set Manager (LSM) 168 will determine whether the Server Pool Descriptor Linked Set (SPDLS) 166 contains the maximum allowable number of Independent-Memory Pool Identifier entries (IPOOLIDs) 160 and, if the Server Pool Descriptor Linked Set (SPDLS) 160 does contain the maximum number of Independent-Memory Pool Identifier entries (IPOOLIDs) 160, will delete one or more least recently used Independent-Memory Pool Identifier entries (IPOOLID) 160 from the Server Pool Descriptor Linked Set (SPDLS) 166. Linked Set Manager (LSM) 168 will then construct a new Independent-Memory Pool Identifier entry (IPOOLID) 160 corresponding to the task and will enter the new Independent-Memory Pool Identifier entry (IPOOLID) 160 at the head of the linked set.

5. Summary of Memory Operations (FIG. 8)

It may be seen from the above descriptions, therefore, that, for any first system virtual address generated by a First System 10 task executing on Second System 54, INTERPRETER 72 will translate the First System 10 virtual address into a byte oriented virtual address containing a virtual address location within a segment and identifying a Segment 3, 4, 5 or 6 containing the location. The INTERPRETER 72 mapping of segments via ADDRXLT98 will in turn map each segment identified by an address translation into an Independent Memory Pool Identification (IPOOLID) 160 for the current task. The Segment/Independent Memory Pool mapping mechanism (i.e., ADDRXLP96) of the Pseudo Device Driver (PSDD) 74 executing the task request associated with the First System 10 virtual address will map the segment identified by the address translation mechanism to a current Independent Memory Pool (IPOOL) 112 location in System 54's memory by providing the base address corresponding to the Independent Memory Pool Identification (IPOOLID) 160.

E. Emulation of Disk Drives

As described, one of the types of First System 10 input/output operations emulated by the Pseudo Device Drivers (PSDDs) 74 of the present invention is the emulation of First System 10 disk input/output operations. It has been described that First System 10 performs disk input/output operations in response to a request from a task by creating an Indirect Request Block (IRB) 36 and a lower level task to execute the input/output operation, wherein the lower level task controls a disk Driver 44 to execute the operation, using information read from a resource control table describing the disk drive to control the operation.

The information contained in the resource control table, and the specific operations executed by the Driver 44 in executing the request, are determined by the type of disk drive involved in the operation. In the instance of an intelligent disk drive, for example a SCSI type drive, the resource control table essentially contains only information identifying the type of drive. The capacity of the drive is read from the drive itself and no further information is required because the drive itself contains the "intelligence" to perform the majority of operations necessary to read from or write to the drive. In the instance of an older or less "intelligent" drive, however, the resource control table must identify not only the type and capacity of the drive, but must provide information sufficient for the Driver 42 to perform detailed control of the drive.

The emulation mechanisms of the present invention thereby allow First System 10 to use virtually any type of input/output device so long as it is of a type suitable for the requested input/output operation, and in particular any type of disk drive. That is, a task need only issue a request for a disk input/output operation, wherein the request identifies the disk unit to be read from or written to and the information to be read or written. Thereafter, the corresponding Driver 44 will read the information describing the characteristics of the disk drive that are necessary to execute the operation from the corresponding resource control table and will read the "capacity" of the "drive" from the second system process emulating the drive and will execute the requested operation. The requesting task need not be aware of, or constrained by, the specific type of disk drive to which the operation was performed.

It is apparent from the above descriptions of the present invention for emulating a First System 10 on a Second System 54 that, because of the level at which the boundary between First System 10 operations and Second System 54 operations is drawn, the tasks executing "in" First System 10 are not aware of the detailed operation of the Second System 52 processes executed in performing disk input/output requests. As such, the present invention provides essentially complete freedom in the manner in which Second System 52 actually performs all input/output operations, including disk input/output operations.

According to the present invention, therefore, and because the emulation mechanisms of the present invention allow First System 10 to use virtually any type of disk drive, all disk drives for First System 10 tasks executing on Second System 52 in emulation of First System 10 are defined in the resource control tables of Emulator Executive Level (EEXL) 64 to be intelligent drives, such as SCSI drives. As such, the only information required from the resource control tables to perform an input/output operation is the identification of drive type, as a SCSI drive, and the "drive capacity" provided by the second system process emulating the disk drive. The Second System Kernel Processes (SKPs) 66 actually performing the emulated input/output operations are free to perform any operation that will result in a transfer of the requested data to or from the requesting First System 10 task executing in First System Process (FSP) 80.

In addition, and because the emulated drive is transparent to the requesting task, that is, the First System 10 tasks are not aware of the actual characteristics of the disk drive emulated by the corresponding Pseudo Device Driver (PSDD) 74, the emulated disk drive defined by the corresponding resource control table may be of any capacity and is not constrained either by the characteristics of the actual Second System 54 hardware device used to perform the operation or by the characteristics of the "native" First System disk drives.

Referring now to the Second System 54 processes emulating disk input/output operations, the Second System Kernel Processes (SKPs) 66 performing disk input/output operations are implemented as standard UNIX type file input/output processes, as are well known in the art, and the "capacity" of the "drive" as provided by the file input/output processes emulating a disk drive are, in fact, the capacity of the file to which the file input/output operation is performed. As a result, the actual Second System 54 operations performed in emulating First System 10 disk input/output operations are completely under the control of Second System 54. As a consequence, Second System 54 may use any of its native hardware devices to actually perform the emulated disk input/output operations without constraint from the tasks of First System 10. For example, Second System 54 may use any of its native disk drives for the operations, and need not use a disk drive at all but may use any other device capable of providing the desired result, such as a non-SCSI drive.

It should be noted with regard to the above that, in the "native" First System 10 environment, the information contained in a disk drive is contained in a "volume" wherein a "volume" can contain one or a plurality of files. In the emulation of disk drives on Second System 54, however, a First System 10 "volume" is treated as and is a Second System 54 file, in accordance with Second System 54's emulation of disk operations as file input/output operations.

In addition, it is known that SCSI type disk drives are conventionally fixed devices, that is, cannot be "mounted" to or "dismounted" from a system and a conventional SCSI drive is therefore essentially a fixed system resource. According to the present invention, however, the disk drives emulated by Second System 54 are presented to the tasks of First System 10 as SCSI drives but in fact are actually Second System 54 files, although the First System 10 tasks "see" the emulated disk input/output only as SCSI drives. As files are "mountable" units, the Second System 54 files and file input/output operations used to emulate First System 10 disk drives thereby appear to First System 10 to be "mountable" disk drives, effectively providing mountable "SCSI" disk drives.

The structure and operation of the present invention are further described by reference to program listings contained in Appendices A, B, C and C published in U.S. Pat. No. 5,619,682 issued on Apr. 8, 1997 for EXECUTING NETWORK LAYERED COMMUNICATIONS OF A FIRST SYSTEM ON A SECOND SYSTEM USING A COMMUNICATION BRIDGE TRANSPARENT TO THE DIFFERENT COMMUNICATION LAYERS, which are hereby incorporated herein by reference and all right, title and interest to which is assigned to Bull HN Information Systems Incorporated, of Billerica, Mass. The Appendices in U.S. Pat. No. 5,619,682 contain program listings for Memory Queue Interface (MQI) 84 and Escape/Call Mechanism (EscapeC) 100, Pseudo Network Layer (PNL) 76a residing and executing in First System Executive Level (FEXL) 16 as a native First System 10 program module and Pseudo Network Driver (PND) 76b, INTERPRETER 72 and the address/segment translation and mapping functions.

All rights, including copyrights, in the subject matter in the Appendices are vested in and the property of Bull HN Information Systems Incorporated of Billerica, Mass., the assignee of the present patent application and any ensuing patent or patents and Bull HN Information Systems Incorporated retains and reserves all rights in the Appendices. Bull HN Information Systems Incorporated, however, grants permission to reproduce the materials in the Appendices for the purposes of prosecution of and issuance of or reproduction of the present patent application and any ensuing patent or patents and for study as necessary for the understanding and teaching of the present invention, but for no other purposes.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. An emulator for emulating a first data processing system on a second data processing system, the first data processing system including a user level, an executive level, an input/output level and a hardware platform, the user level including at least one user program and at least one executive program for managing operations of the first data processing system and the hardware platform including a plurality of first system input/output devices, including a first system memory, the executive level including at least one user task performing user level program operations and at least one executive task performing executive program operations, the user and executive tasks generating requests for first system input/output operations, the input/output level including a plurality of input/output tasks, each input/output task corresponding to a first system input/output device and performing input/output operations in response to the input/output requests and each first system input/output devices performing input/output operations in response to the corresponding input/output task, the emulator executing on the second data processing system and comprising:

a second system user level process executing in a user level of the second data processing system, the second system user level process including
the first system user level program,
the first system executive program, and
the first system user and executive tasks,
an emulator level interposed between the second system user level process and a kernel level, the emulator level including
a plurality of pseudo device drivers, each pseudo device driver corresponding to a first system input/output device,
the kernel level, including
a plurality of kernel processes, each kernel process corresponding to a pseudo device driver, and
a second system hardware platform including,
a plurality of second system input/output devices, each second system input output device corresponding to a kernel process, and
each combination of a pseudo device driver, a corresponding kernel process and a corresponding second system input/output device executing in a second system process and emulating the operations of a corresponding first system input/output task and corresponding input/output device.

2. The emulator of claim 1, wherein the plurality of pseudo device drivers further comprise:

a plurality of pseudo device queues,
each pseudo device queue corresponding to a pseudo device driver and including
a device queue frame for each input/output request directed to the corresponding first system input/output device, each device queue frame containing the request directed to the corresponding input/output device, wherein
each kernel process is responsive to a request stored in a device queue frame of the corresponding pseudo device queue for reading the input/output request from the device queue frame and controlling the corresponding second system input/output device in executing the input/output request,
a return queue,
the return queue including a return queue frame for each input/output request executed by a kernel process, wherein
each kernel process is responsive to the completion of the execution of an input/output request for writing a request result into a return queue frame of the return queue, and
a pseudo device queue manager responsive to
each input/output request generated by a task for writing the input/output request into the pseudo device queue corresponding to the first system input/output device that the input/output request is directed to, and
to each return queue frame in the return queue for providing the request result to the task which generated the corresponding input/output request.

3. The emulator of claim 2 wherein each input/output requests generated by a task is associated with an input/output instruction and wherein the pseudo device queue manager further comprises:

an instruction monitor for detecting first system input/output instructions and generating a input/output instruction output indication upon the occurrence of an input/output instruction, and
a queue write mechanism responsive to an input/output instruction indication from the instruction monitor for writing the associated input/output request into the pseudo device queue corresponding to the first system input/output device to which the input/output request is directed.

4. The emulator of claim 2 wherein the pseudo device queue manager further comprises:

a queue read mechanism responsive to the writing of a return queue frame into the return queue for reading the request result from the return queue from and providing the request result to the task that generated the corresponding input/output request.

5. The emulator of claim 4 wherein each pseudo device queue, further comprises:

a queue header, the queue header including
a semaphore settable by the queue manager when writing a queue frame to the pseudo device queue by the queue manager, wherein each kernel process is responsive to the setting of the semaphore in the queue header of the corresponding pseudo device queue for reading the corresponding queue frame from the pseudo device queue and for setting the semaphore when reading a queue frame from the pseudo device queue, and wherein the queue manager and the kernel process corresponding to a pseudo device queue is responsive to the semaphore of the queue header to inhibit writing a queue frame into the pseudo device queue and reading a queue frame from the pseudo device queue when a queue frame is being written to and read from the pseudo device queue.

6. An method for emulating a first data processing system on a second data processing system, the first data processing system including a user level, an executive level, an input/output level and a hardware platform, the user level including at least one user program and at least one executive program for managing operations of the first data processing system and the hardware platform including a plurality of first system input/output devices, including a first system memory, the executive level including at least one user task performing user level program operations and at least one executive task performing executive program operations, the user and executive tasks generating requests for first system input/output operations, the input/output level including a plurality of input/output tasks, each input/output task corresponding to a first system input/output device and performing input/output operations in response to the input/output requests and each first system input/output devices performing input/output operations in response to the corresponding input/output task, the method executing on the second data processing system and comprising the steps of:

executing a second system user level process in a user level of the second data processing system, the second system user level process including
the first system user level program,
the first system executive program, and
the first system user and executive tasks,
constructing a plurality of pseudo device drivers in an emulator level interposed between the second system user level process and a kernel level,
each pseudo device driver corresponding to a first system input/output device,
executing a plurality of kernel processes the kernel level, each kernel process corresponding to a pseudo device driver, and
providing a plurality of second system input/output devices, each second system input output device corresponding to a kernel process, and
executing each combination of a pseudo device driver, a corresponding kernel process and a corresponding second system input/output device executing in a second system emulation process and,
in each second system emulation process, emulating the operations of a corresponding first system input/output task and corresponding input/output device.

7. The method of claim 6, wherein the step of constructing a plurality of pseudo device drivers further comprises the steps of:

constructing a plurality of pseudo device queues,
each pseudo device queue corresponding to a pseudo device driver and including
a device queue frame for each input/output request directed to the corresponding first system input/output device, each device queue frame containing the request directed to the corresponding input/output device, wherein
each kernel process is responsive to a request stored in a device queue frame of the corresponding pseudo device queue for reading the input/output request from the device queue frame and controlling the corresponding second system input/output device in executing the input/output request,
constructing a return queue,
the return queue including a return queue frame for each input/output request executed by a kernel process, wherein
each kernel process is responsive to the completion of the execution of an input/output request for writing a request result into a return queue frame of the return queue, and
constructing a pseudo device queue manager responsive to
each input/output request generated by a task for writing the input/output request into the pseudo device queue corresponding to the first system input/output device that the input/output request is directed to, and
each return queue frame in the return queue for providing the request result to the task which generated the corresponding input/output request.

8. The emulator of claim 7 wherein each input/output requests generated by a task is associated with an input/output instruction and wherein step of writing input/output requests into the pseudo device queues further comprises the steps of:

detecting first system input/output instructions and generating a input/output instruction output indication upon the occurrence of an input/output instruction, and
responsive to an input/output instruction indication, writing the associated input/output request into the pseudo device queue corresponding to the first system input/output device to which the input/output request is directed.

9. The emulator of claim 7 wherein the step of reading a request result from the return queue further comprises the steps of:

responsive to the writing of a return queue frame into the return queue, reading the request result from the return queue from and providing the request result to the task that generated the corresponding input/output request.

* * * * *